US012750333B2

(12) United States Patent
Milich et al.

(10) Patent No.: US 12,750,333 B2
(45) Date of Patent: Sep. 29, 2026

(54) SHARING STRUCTURED VIEWS OF EMAIL MESSAGES BETWEEN USERS

(71) Applicant: Notion Labs, Inc., San Francisco, CA (US)

(72) Inventors: Andrew Milich, San Francisco, CA (US); Jason Ginsberg, San Francisco, CA (US); Nishil Shah, San Francisco, CA (US); Arpeet Kale, San Jose, CA (US); Peter Lu, San Francisco, CA (US); Byeong Chan Lee, Long Island City, NY (US); Sunny Li, San Francisco, CA (US); Natalie Almosa, Toronto (CA); Guangyu Zhang, San Francisco, CA (US); Nicholas Giancarlo Gervasi, Kirkland (CA); Simon Townsend-Last, New York, NY (US); Huan Zhao, San Francisco, CA (US); Farzad Khosrowshani, Greenwich, CT (US); Terry Thunder Tsai, Brooklyn, NY (US)

(73) Assignee: Notion Labs, Inc., San Francisco, CA (US)

( * ) Notice: Subject to any disclaimer, the term of this patent is extended or adjusted under 35 U.S.C. 154(b) by 74 days.

(21) Appl. No.: 18/743,867

(22) Filed: Jun. 14, 2024

(65) Prior Publication Data

US 2025/0385885 A1 Dec. 18, 2025

(51) Int. Cl.

| | |
|---|---|
| ***H04L 51/42*** | (2022.01) |
| ***G06Q 10/107*** | (2023.01) |
| ***H04L 51/212*** | (2022.01) |

(52) U.S. Cl.

CPC ............ *H04L 51/42* (2022.05); *H04L 51/212* (2022.05); *G06Q 10/107* (2013.01)

(58) Field of Classification Search

CPC ...... H04L 51/42; H04L 51/212; G06Q 10/107

See application file for complete search history.

(56) References Cited

U.S. PATENT DOCUMENTS

| | | | |
|---|---|---|---|
| 10,375,003 | B1 | 8/2019 | Olsen et al. |
| 11,138,174 | B2 | 10/2021 | Semenov |
| 11,162,071 | B2 | 11/2021 | Loose et al. |
| 11,526,779 | B2 | 12/2022 | Bringsjord et al. |

(Continued)

FOREIGN PATENT DOCUMENTS

| | | | |
|---|---|---|---|
| EP | 2610812 | B1 | 7/2015 |

OTHER PUBLICATIONS

ISA, International Search Report for International Application No. PCT/US2024/036178, mailed on Oct. 23, 2024, 6 pages.

(Continued)

*Primary Examiner* — Chris Parry

(74) *Attorney, Agent, or Firm* — Dorsey & Whitney LLP

(57) ABSTRACT

The system obtains multiple views associated with a first multiplicity of messages, where a view among the multiple views includes a criterion, a visual appearance, and an action. The criterion defines a message to include in the view, and the action is configured to trigger automatically when the message is included in the view. The system applies the view to the second multiplicity of messages by: selecting a subset of messages among the second multiplicity of messages according to the criterion; presenting the subset of messages to the user according to the visual appearance associated with the view; and performing the action on the subset of messages.

17 Claims, 24 Drawing Sheets

(56) References Cited

U.S. PATENT DOCUMENTS

| | | | | |
|---|---|---|---|---|
| 11,546,281 | B1 | 1/2023 | Brown | |
| 11,777,892 | B1 | 10/2023 | Sen et al. | |
| 11,947,902 | B1 | 4/2024 | Grimshaw et al. | |
| 2006/0206451 | A1 * | 9/2006 | Brown | G06Q 10/107 |
| 2007/0174407 | A1 | 7/2007 | Chen et al. | |
| 2008/0133501 | A1 | 6/2008 | Andersen et al. | |
| 2012/0215866 | A1 | 8/2012 | Satterfield et al. | |
| 2012/0297300 | A1 | 11/2012 | Mahoney et al. | |
| 2013/0086180 | A1 * | 4/2013 | Midgen | H04L 51/214 709/206 |
| 2013/0086485 | A1 * | 4/2013 | Ahiakpor | H04L 51/42 715/752 |
| 2013/0268839 | A1 * | 10/2013 | Lefebvre | G06F 40/10 715/254 |
| 2015/0033141 | A1 * | 1/2015 | Mishra | H04L 51/42 715/752 |
| 2015/0180811 | A1 * | 6/2015 | Cornwell | H04L 51/212 709/206 |
| 2018/0181378 | A1 | 6/2018 | Bakman | |
| 2018/0232441 | A1 | 8/2018 | Lin et al. | |
| 2019/0187874 | A1 | 6/2019 | Canfield et al. | |
| 2021/0342785 | A1 | 11/2021 | Mann et al. | |
| 2021/0406836 | A1 * | 12/2021 | Bar-On | G06F 40/205 |
| 2022/0044321 | A1 | 2/2022 | Monahan et al. | |
| 2023/0153761 | A1 * | 5/2023 | Gandhi | G06F 3/0485 709/206 |
| 2025/0274407 | A1 | 8/2025 | Lambert | |
| 2025/0355897 | A1 * | 11/2025 | Sheetrit | G06F 16/285 |

OTHER PUBLICATIONS

Non-Final Office Action received in U.S. Appl. No. 18/744,075 dated Jun. 17, 2026, pp all.

* cited by examiner

SHARING STRUCTURED VIEWS OF EMAIL MESSAGES BETWEEN USERS

BACKGROUND

Currently, email users are confined to a 10- to 20-year-old user interface that imposes arbitrary and frustrating constraints. For example, the Gmail sidebar now has over ten default tabs, every email has four on-hover actions, the default inbox view is confusingly opinionated, including uninformative tabs such as "social," "promotions," and "updates," and buttons or cards such as "track package" and "flight info" show up on unexpected emails.

BRIEF DESCRIPTION OF THE DRAWINGS

Reference will now be made, by way of example, to the accompanying drawings which show example embodiments of the present application, and in which.

Figure 1:
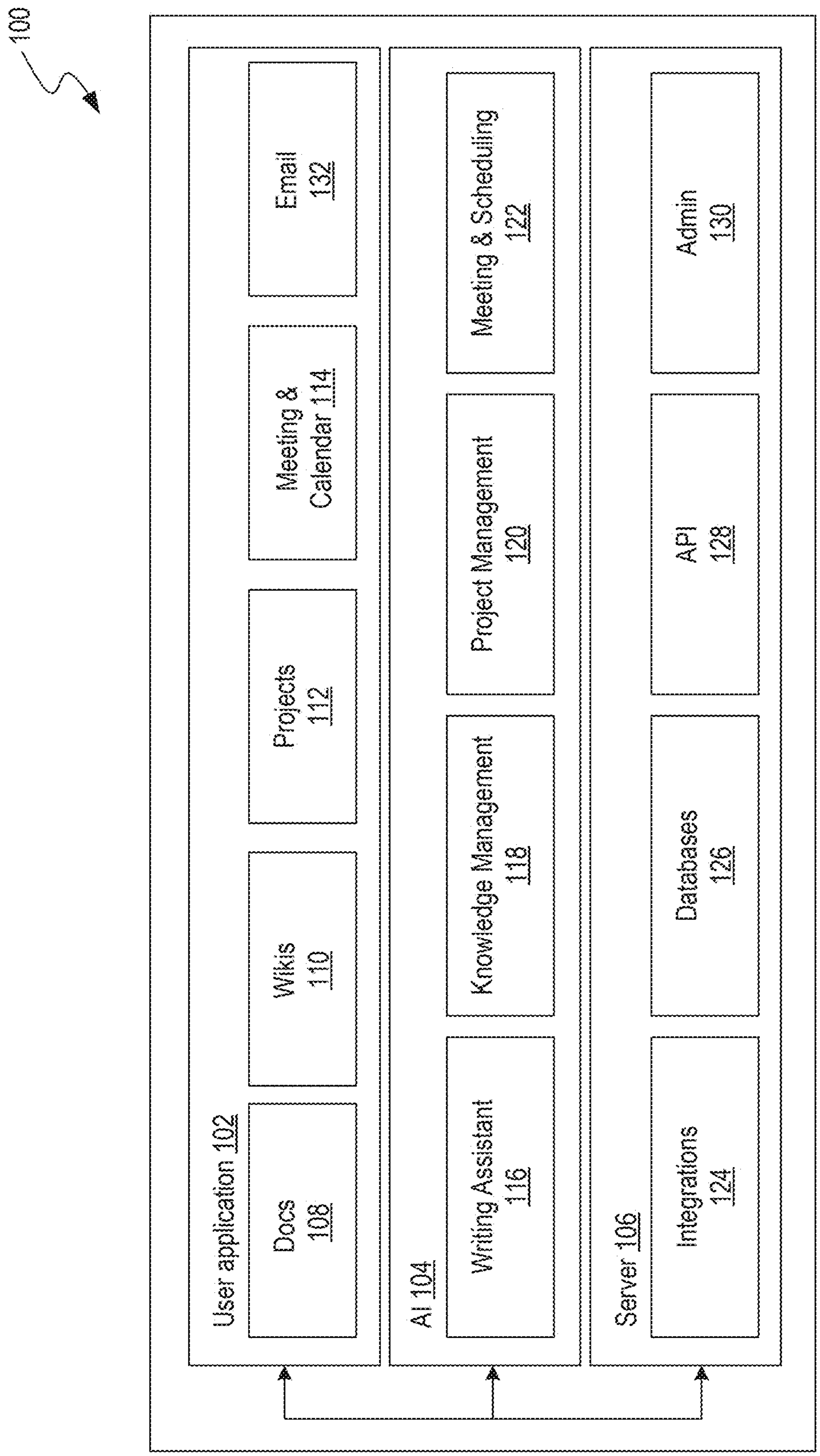
FIG. 1 is a block diagram of an example system to provide users with an all-in-one workspace for data and project management.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one embodiment, the disclosed system and method represent an email inbox as a customizable database configured to be presented in a user interface as a table including multiple rows and multiple columns. The database can be customized by creating a custom column such as a summary column, translation column, or a thumbnail column including thumbnails of email attachments.

The system can create multiple views of the database by receiving an indication to create a view of the email inbox. The indication to create the view includes a criterion configured to select a subset of email messages from the multiple email messages. The criterion can be based on the custom column, sender, receiver, subject line, etc.

The system creates the view including multiple layouts, including a layout A showing a calendar representing multiple dates associated with the subset of email messages, a layout B showing a relevant subset of the multiple columns, and a layout C showing urgent information associated with the subset of email messages.

In another embodiment, the disclosed system and method obtain multiple views associated with multiple email messages A, where a view among the multiple views includes a criterion, a visual appearance, and an action. The criterion defines an email message to include in the view, and the action triggers automatically when the email message is included in the view. The system provides the multiple views to a user associated with multiple email messages B, by, for example, providing the multiple views in a user interface for selection.

The system receives an indication to apply the view among the multiple views to the multiple email messages B by, for example, receiving a selection in the user interface. The system applies the view to the multiple email messages B by: selecting a subset of email messages among the multiple email messages B according to the criterion; presenting the subset of email messages to the user according to the visual appearance associated with the view; and performing the action on the subset of email messages.

In a third embodiment, the disclosed system and method obtain multiple views associated with a multiple email messages A, where a view among the multiple views includes a visual appearance and a criterion among multiple criteria defining an email message to include in the view. The system obtains multiple email messages B, which the system can perform during onboarding or as new messages come in.

The system analyzes the multiple email messages B using the multiple criteria to determine number of email messages satisfying the criterion. The system determines whether the number of email messages satisfying the criterion among the multiple criteria satisfies a predetermined threshold, such as more than 50 email messages. Upon determining that the number of email messages satisfying the criterion among the multiple criteria satisfy the predetermined threshold, the system suggests organizing the number of email messages satisfying the criterion according to the view.

The system receives an approval to organize the number of email messages satisfying the criterion according to the view, and, upon receiving the approval, the system presents the number of email messages according to the visual appearance associated with the view.

In a fourth embodiment, the disclosed system and method obtains multiple email messages, where an email message among the multiple email messages includes multiple properties. The system can provide a table including the multiple email messages in a user interface. The table can include multiple rows and multiple columns, where the multiple columns correspond to respective properties of the multiple properties and a row corresponds to one or more email messages. The table can be configured to be modified by content created by a generative artificial intelligence (AI) system.

The system can modify the user interface by receiving an indication to modify the table with content of a particular type. The indication can include a selection of one or more rows of the multiple rows in the table wherein the selection of the one or more rows is across at least part of the multiple columns of the table.

The system can cause the generative AI system to create content of the particular type based on the indication and the selection of the one or more rows. The system can modify the user interface by adding the content of the particular type created by the generative AI system to the user interface.

In a fifth embodiment, the disclosed system and method obtains multiple email messages. An email message among the multiple email messages can include multiple properties. Each of the multiple email messages can include content. The system can provide a user interface to display the multiple email messages. The multiple email messages can be configured to be presented in a table including multiple rows and multiple columns. A row among the multiple rows can correspond to one or more email messages. A first column among the multiple columns can include features extracted from the content of the multiple email messages. The user interface can include a unique identification (ID) associated with the row, and a unique ID associated with the first column.

The system can customize the user interface by receiving an indication to create a graphical representation of the content of the multiple email messages. The indication can include obtaining a first formula configured to create the graphical representation, where the first formula includes the unique ID associated with the row and/or the unique ID associated with the first column. The first formula can indicate an operation to be performed on a content identified by the first row and/or the first column.

The system can create the graphical representation of the operation applied to the content identified by the first row and/or the first column. The system can provide the graphical representation of the content identified by the first row and/or the first column on the user interface.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and moved across workspaces. The block model allows users to customize how their information is moved, organized, and shared. Hence, blocks contain information but are not siloed.

Blocks are singular pieces that represent all units of information inside an editor. In one example, emails, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested subpages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example system 100 to provide users with an all-in-one workspace for data and project management. The system 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114 and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or subpages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this" or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the system 100 to another email address within the system 100, can include an embedding of a document within the system 100 or an embedding of a block in the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), generative adversarial networks (GANs), variational autoencoders (VAEs), and autoregressive models, among others.

DNNs are often used as ML-based models for modeling complex behaviors (e.g., human language, image recognition, object classification, etc.) in order to improve the accuracy of outputs (e.g., more accurate predictions), for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimizing a loss or maximizing a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistants).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
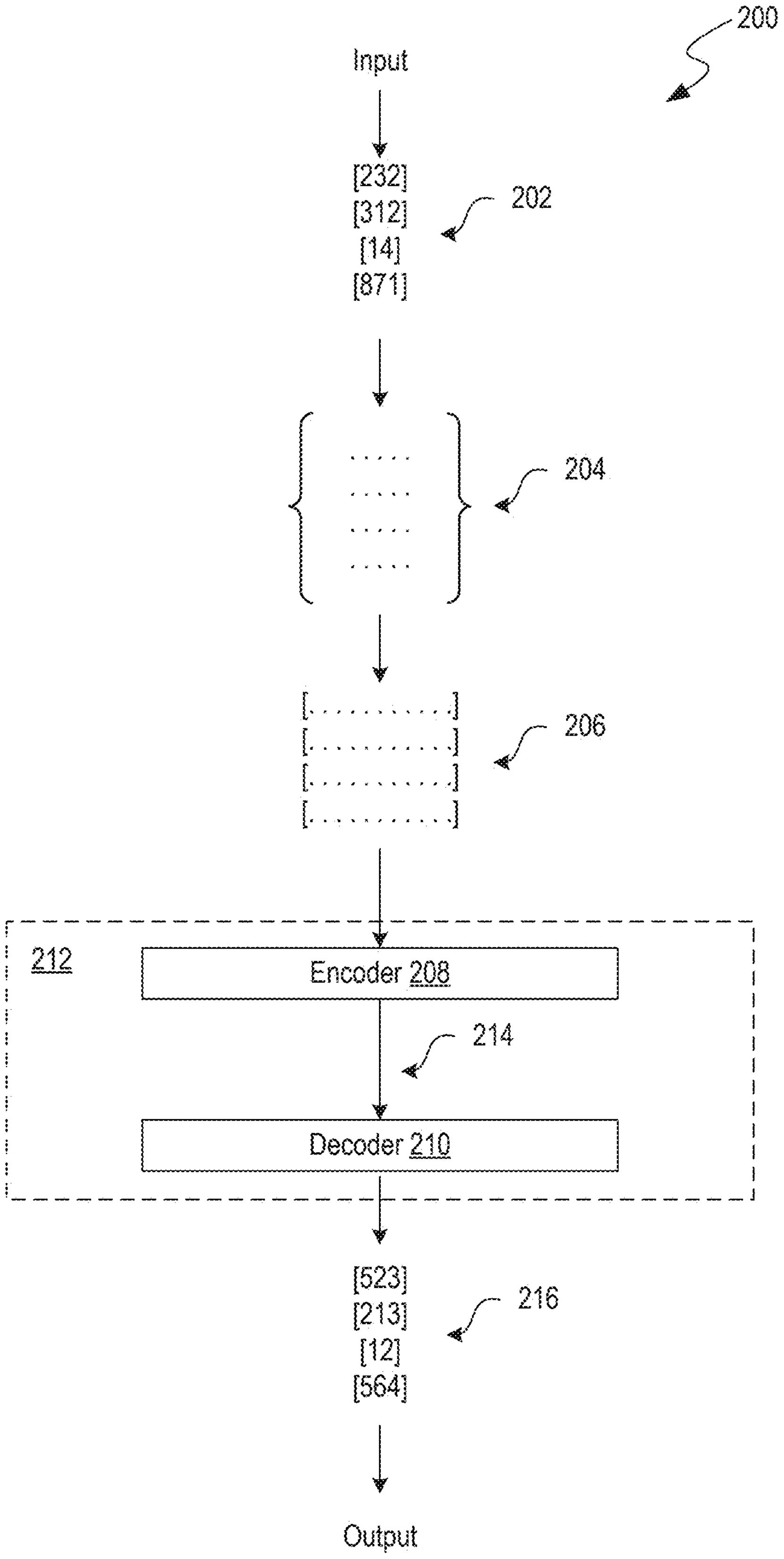
FIG. 2 is a block diagram of an example transformer.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use autoregression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
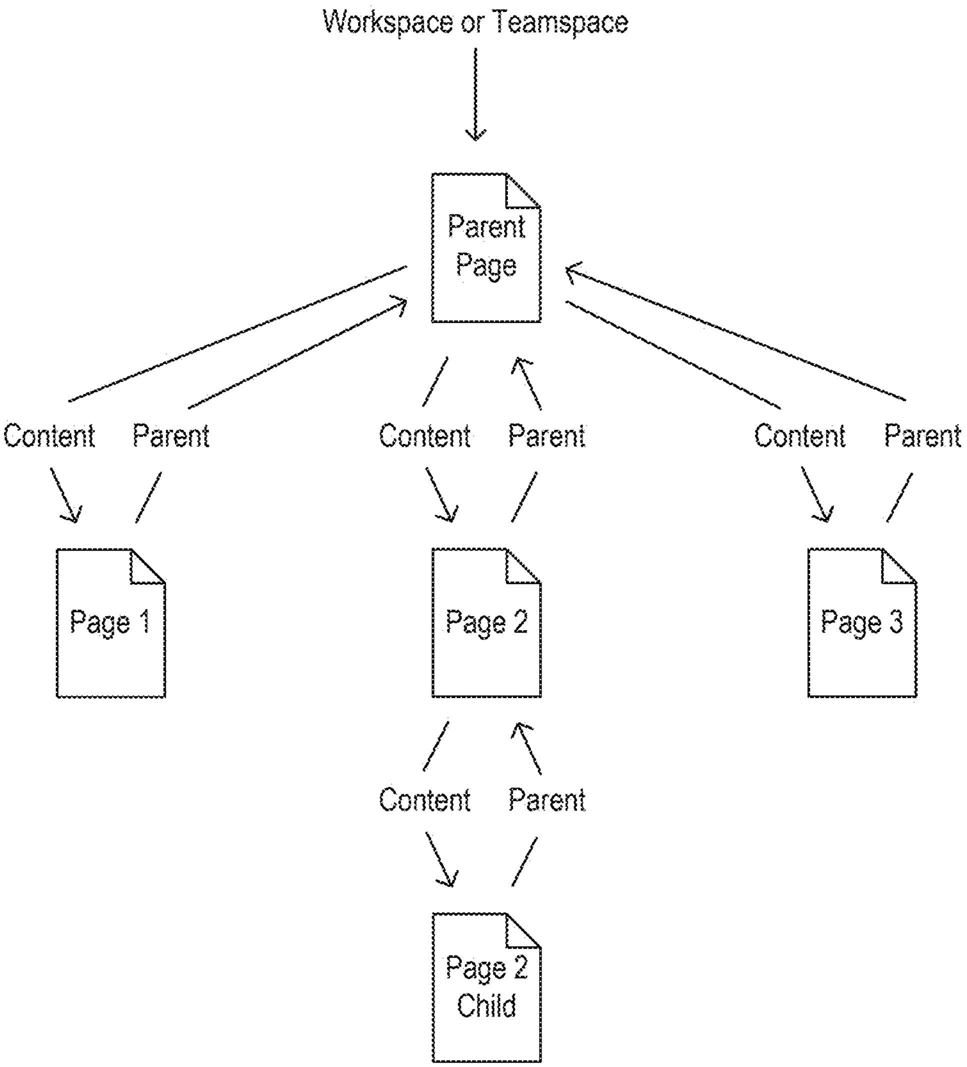
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child" which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically, which is above them in the tree. For example, "Page 2" inherited the access permission of the "Parent page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Representing an Email Inbox as a Customizable Database

Figure 4:
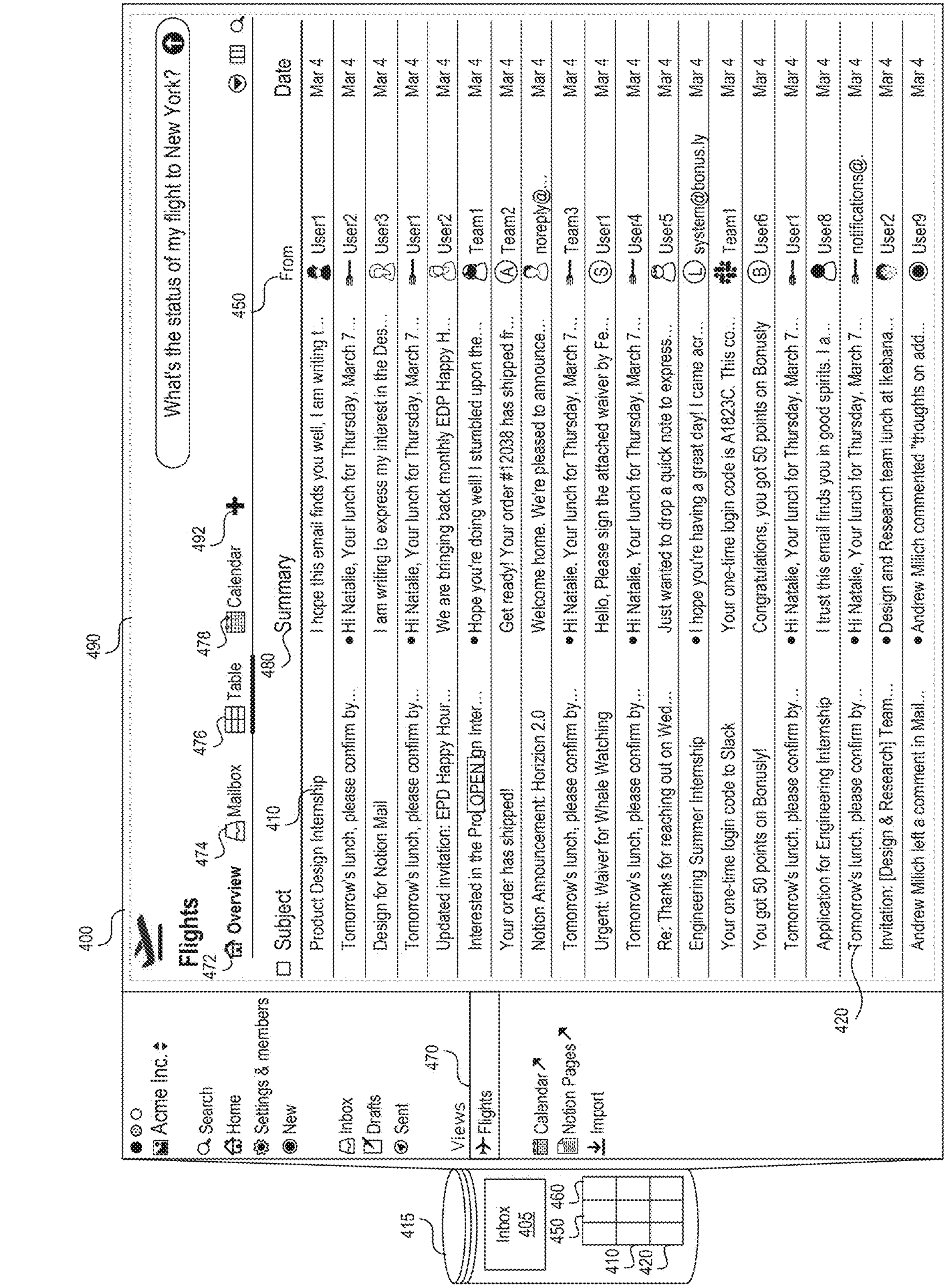
FIG. 4 shows a custom view with multiple layouts.

FIG. 4 shows a custom view with multiple layouts. The inbox 400 contains multiple messages 410, 420 (only two labeled for brevity). The messages 410, 420 can be email messages, text messages, instant messages, etc. The inbox 400 is associated with a view 470 and represents a subset of all messages included in an inbox 405 stored in a database 415. The database 415 can include multiple rows of messages 410, 420, and multiple columns 450, 460, some of which are also included in the view 470.

The inbox 400 can include multiple views 470, which can include multiple layouts 472, 474, 476, 478. Each view can be customized in various ways. Each view can include a criterion dictating a selection of a subset of messages 410, 420 to present in the view 470. The criterion can be based on the sender, on content of the mail, on the date, on the recipients, on the attachments, on AI extracted properties, etc. The view 470 can be based on the sender, such as airlines, or content of the mail, such as flights. For example, the view 470 can be based on the sender, and the system can generate the view by filtering emails received from United or other airlines.

Other examples of views can include criteria such as:
- Important (including a user-learned definition of what is important and the user needs to respond to)
- Calendar transactional emails
- Trips
- One-off "projects"
- "Trip to Italy in June"
- "2024 taxes"
- "Buying a car"
- Packages/Deliveries
- Candidates (and related views for job offers, onboarding)
- Customers
- Reservations
- Family
- Coupons/discounts
- Company (i.e., all emails with people who work at the same company or a team at that company, which can be an external company)
- Positive replies (e.g., mass marketers who want to filter out all the angry replies)
- Support inbox
- Photos (e.g., Hawaii trip 2024 photos)
- Doctor appointments
- Tickets (movies, concerts)
- Waiting for your reply
- Legal contracts
- Cap table
- School work (e.g., ECON 101 view, or "clubs" or "college applications" view)
- Education (Udacity, Khan Academy, Coursera)
- Newsletters
- Personal finance, credit card and bank statements
- Purchases
- Clothing purchases with brand and sizing
- Work vs. personal
- Social media
- Subscriptions (Netflix, DisneyPlus, iCloud, Spotify), expiring subscriptions
- Sports (general sports content)
- Sports team (filter on team)
- Housing (apartments, rentals, home buying, Airbnb)
- "Snooze" (e.g., could be implemented as a property in a view or an automation that can automatically snooze a category of email, say for the weekend)
- Relevant people column
- Emails with attachments The view 470 can further be personalized to the user by enabling the user to add a custom column 480. The user interface 490 can include a button 492, which enables the user to define one or more custom columns 480. The custom column 480 can include a status view, which indicates beginning, in progress, or concluded.

If the view 470 is related to doctor appointments, the custom column 480 can include the doctor, the type of specialty, the location, AI extracted properties, or the calendar date of the next appointment. If the view 470 is related to emails with attachments, the view 470 can have the custom column 480 showing thumbnails of attachments.

The system can automatically create the view 470 by analyzing the inbox 405 during onboarding, or during usage to find a frequently occurring type or category of email, such as 300 past emails from United, 100 messages from a doctor's office, 50 messages containing attachments, 200 messages with hyperlinks, shopping newsletters, customer relationship management, etc. Upon finding the frequently occurring type of email, the system can suggest a curated flight view 470 that was made and shared by another user of the system or that the system made. The system can also automatically create and suggest labels within a view. For example, system can suggest "United", "Delta" and "Alaska" as an airline label for a custom column in a flight view.

In addition, the system can receive an unstructured prompt, such as a natural language prompt, describing a view to create. For example, the prompt can state "create a view for my 2024 taxes." The system can perform NLP on the prompt, and based on the NLP, the system can create the criterion including emails from the accountant and emails including tax forms such as W-2 forms. Based on the criterion, the system can create a view of all the emails related to 2024 taxes.

Figure 5:
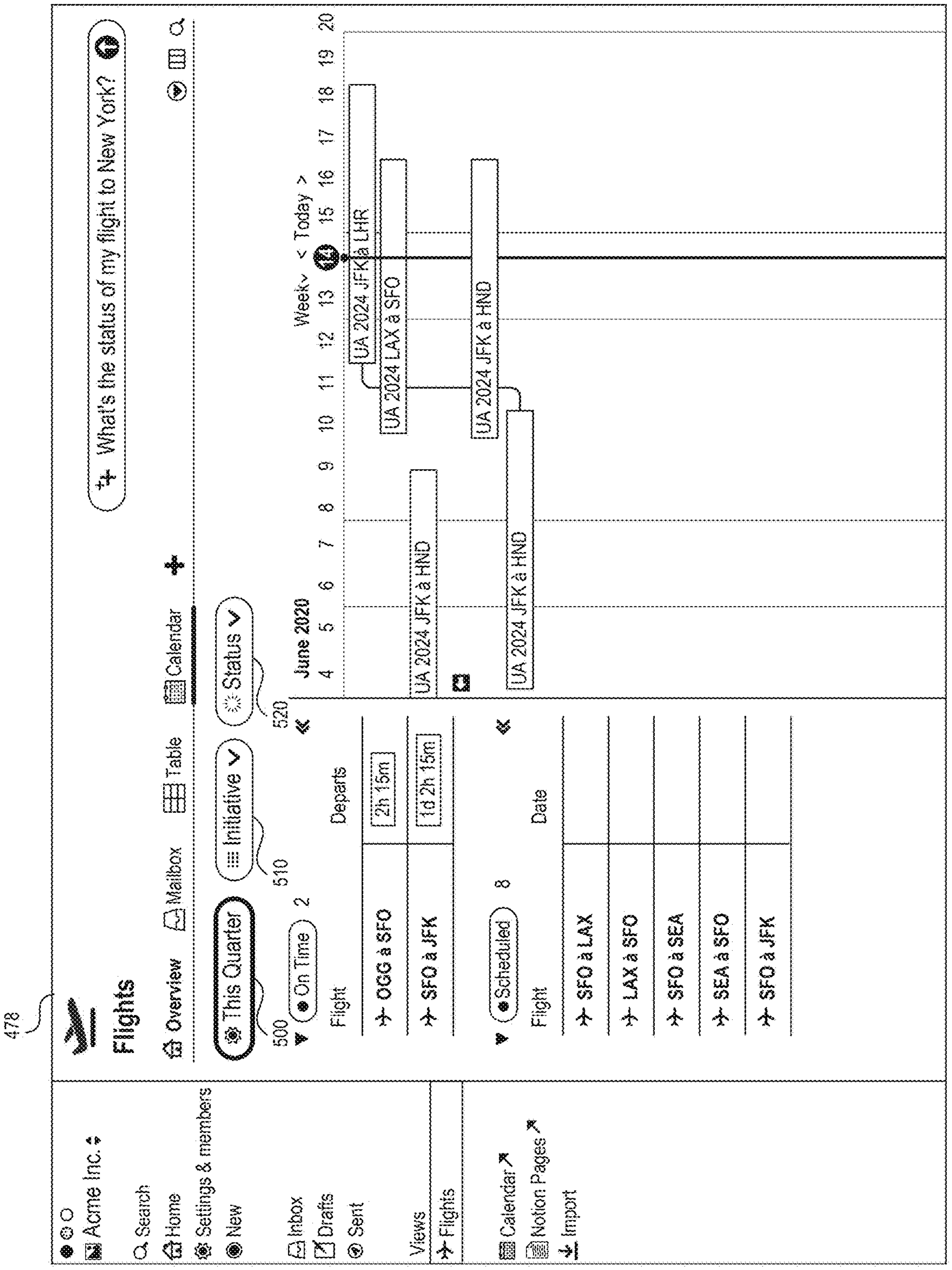
FIG. 5 shows a layout including a calendar of the view.

FIG. 5 shows a layout including a calendar of the view 470 in FIG. 4. The layout 478 represents information contained in the inbox 400 in FIG. 4 as a timeline layout. In addition, the layout 478 can be further filtered based on additional rules 500, 510, 520.

For example, the rule 500 can specify to only show the flights occurring in this quarter. The rule 510 can specify to show the status of the flight, such as on-time or scheduled. The rule 520 can specify to show an event associated with the flight, AI property, or information derived from an external source using an API.

Figure 6:
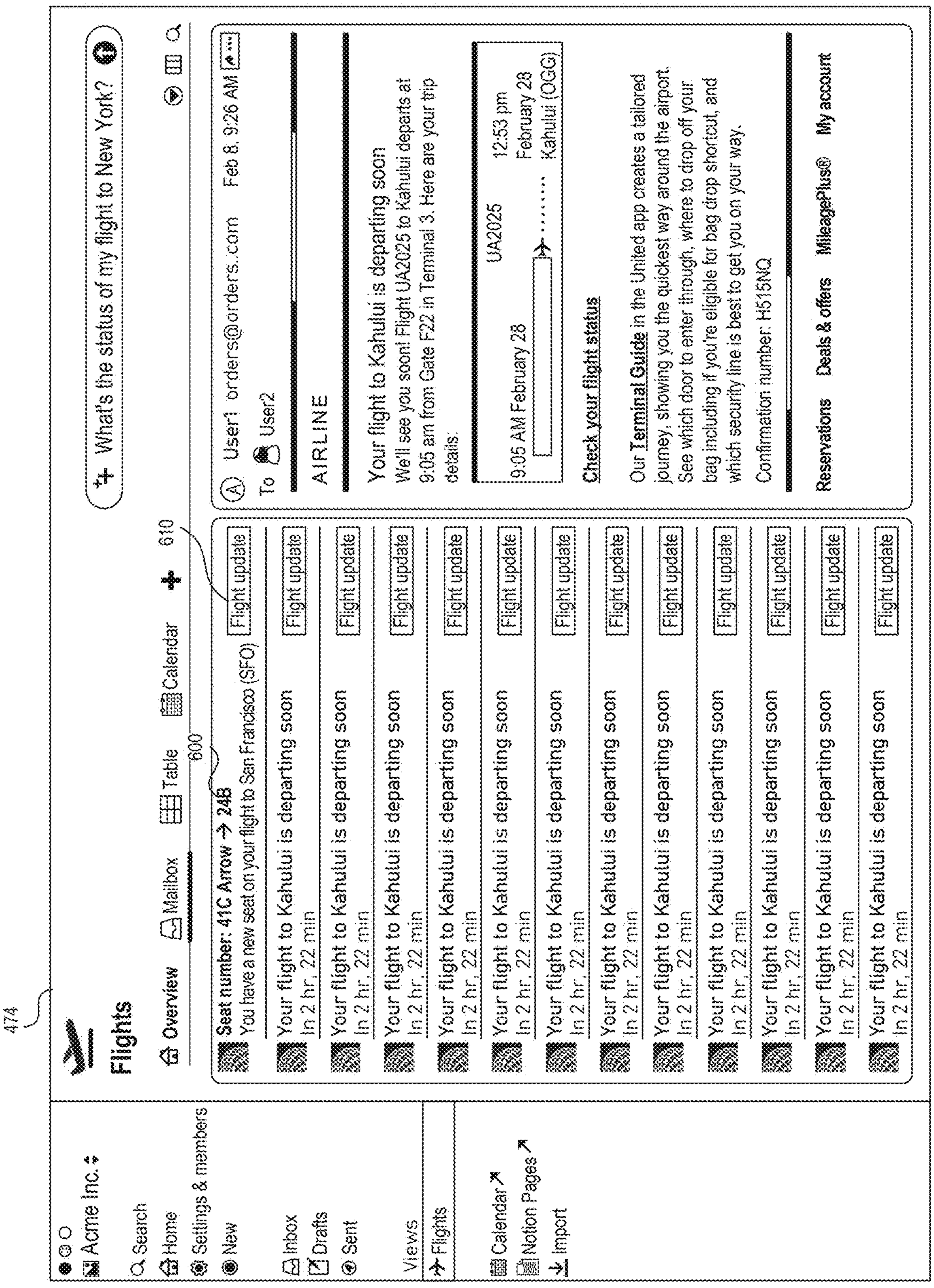
FIG. 6 shows a simplified layout of the view.

FIG. 6 shows a simplified layout 474 of the view 470 in FIG. 4. The inbox 400 in FIG. 4, or the full inbox 405 in FIG. 4, can have many columns, such as 20 columns, due to multiple custom columns that the user can add. Consequently, many columns can be difficult to view and can become overwhelming.

To simplify the layout, the system can automatically create the simplified layout 474 that includes fewer columns than the inbox 400, 405. The system can analyze the inbox 400 to determine the relevant columns 600, 610, such as three or four columns to include in the layout 474. The relevant columns can include the subject line, a status column, a column containing actionable items, and/or a translation column. The translation column can include a summary of the email translated into the appropriate language, subject line translated into the appropriate language, text of email translated into the appropriate language, etc. The actionable item columns can be columns that include hyperlinks to pages, such as check-in buttons.

Figure 7:
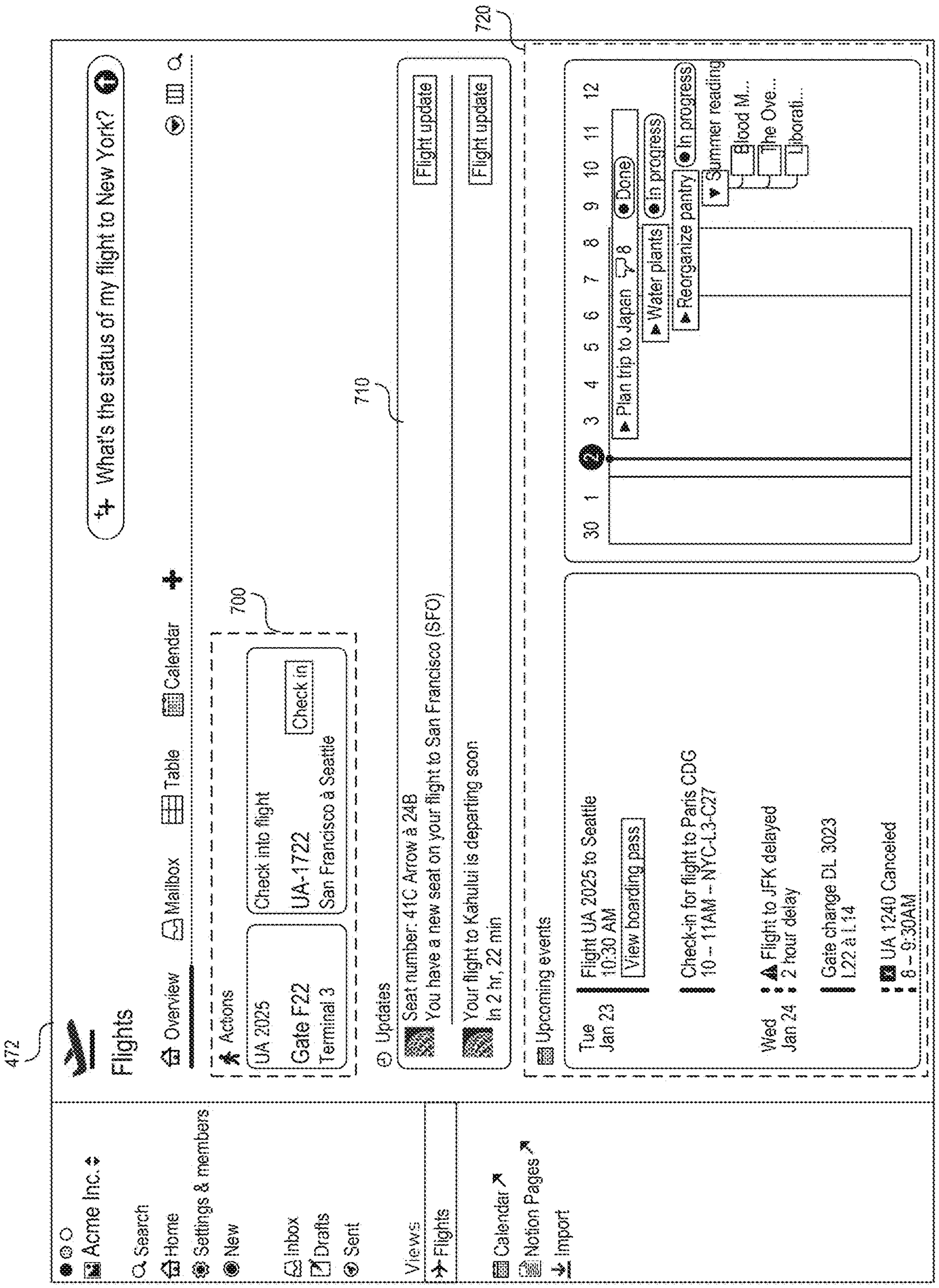
FIG. 7 shows an urgent item layout of the view.

FIG. 7 shows an urgent item layout 472 of the view 470 in FIG. 4. The urgent item layout can include information within an immediate time window such as within the next several days up to a week. The urgent item layout can include sections 700, 710, 720, which can be presented to the user based on urgency, namely based on the time that they are due.

Section 700 can include actions that are due within the immediate time window or an even shorter time window such as the next day. Section 710 can include updates regarding the actions presented in section 700. Section 720 can present a calendar view of the upcoming events within the immediate time window, which can be longer than the time window presented in section 700.

Figure 8:
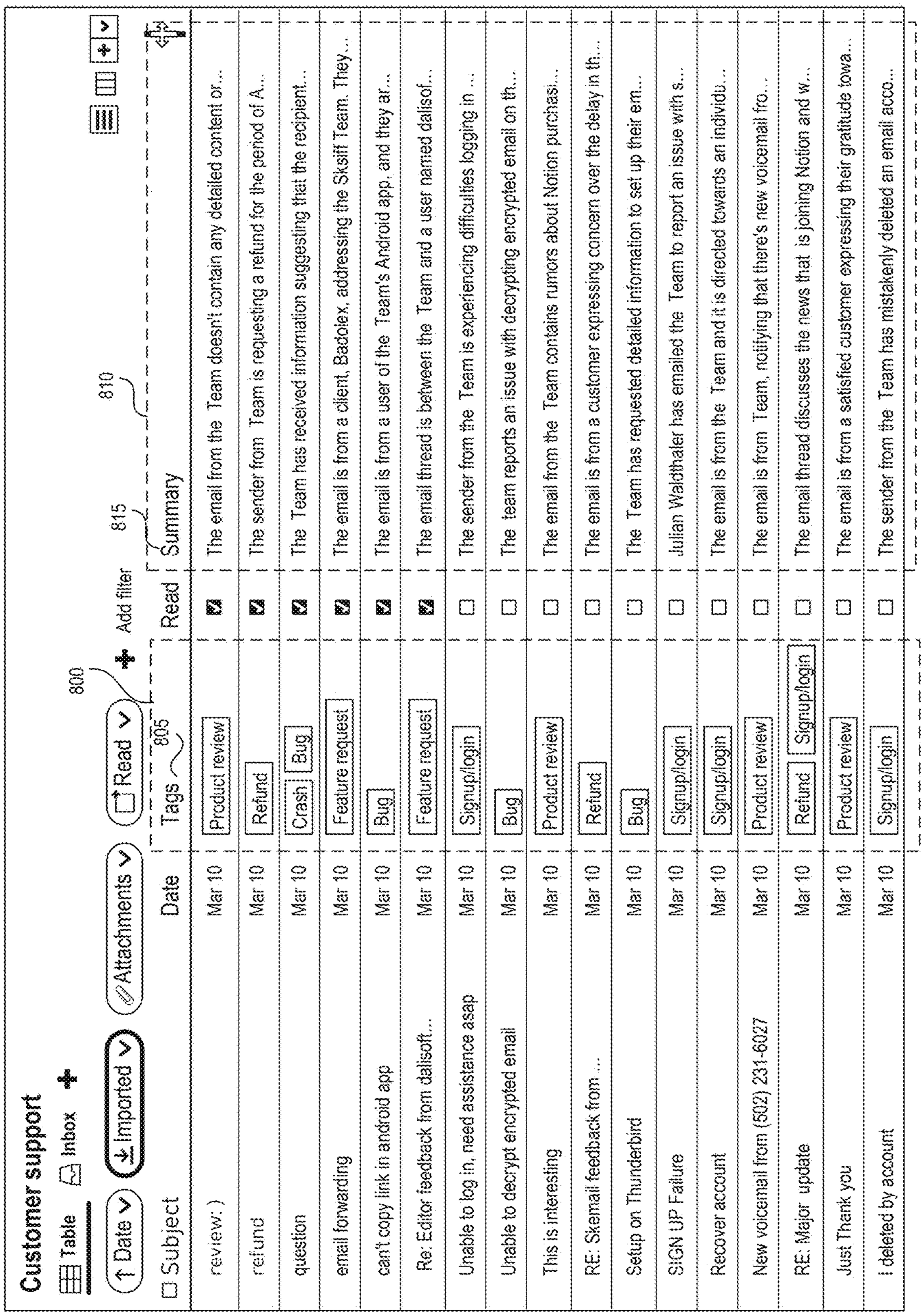
FIG. 8 shows multiple examples of custom columns.

FIG. 8 shows multiple examples of custom columns. The custom columns 800, 810 can have various types such as tag 805 or summary 815. The system can automatically suggest the type of column, as well as populate the entries in each column 800, 810.

The column 800 of type tag 805 can include tags describing a type of email such as "product review," "refund," "cash," "bug," "feature request," or "sign-up/login." The column 800 of type tag 805 can include tags describing a status such as "receipt," "processing," or "resolved." The custom column 810 of type summary can include a summary of the email. The summary of the email can be generated by an artificial intelligence to allow the user to quickly scan through the email and the inbox.

Once the custom columns 800, 810 are created, the system can create views that are generated based on the custom columns. For example, a view can include all messages having a particular tag, user, AI applied label, or text in the custom column 800, 810.

Figure 9:
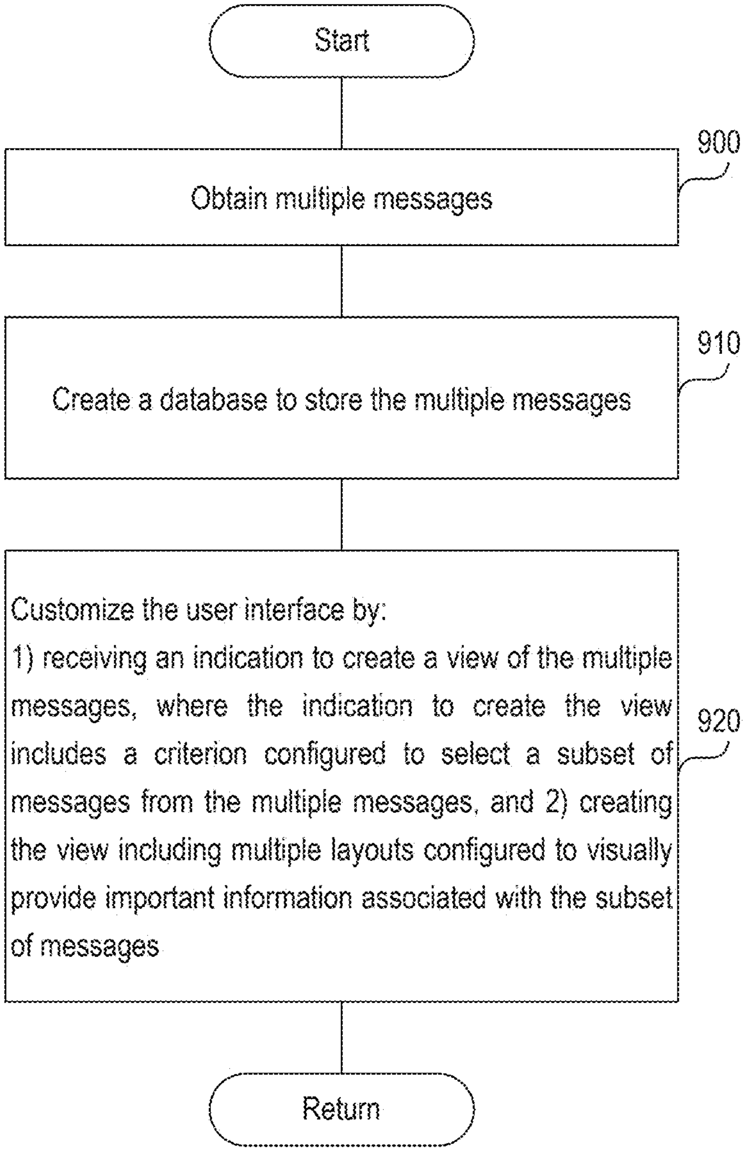
FIG. 9 is a flowchart of a method to represent an email inbox as a customizable database.

FIG. 9 is a flowchart of a method to represent an email inbox as a customizable database. A hardware or software processor executing instructions describing this application can in step 900 obtain multiple messages, where a message among the multiple messages includes multiple properties. A property among the multiple properties includes an indication of a sender an indication of a receiver, and content, where the indication of the receiver includes a user.

In step 910, the processor can create a database to store the multiple messages. The database can be configured to be presented in a user interface including a table including multiple rows and multiple columns. The table and the database are configured to be customized by including a custom column among the multiple columns. The database is configured to group the multiple messages according to a column among the multiple columns. A row can correspond to a message or a message thread, and a column can correspond to the property among the multiple properties.

In step 920, the processor can customize the user interface by receiving an indication to create a view of the multiple messages and creating the view. The indication to create the view includes a criterion configured to select a subset of messages from the multiple messages. The criterion can be based on a sender, receiver, subject line, AI generated properties based on the type of email, and/or the custom column. The processor can present multiple layouts in the view. Each of the layouts visually provides important information associated with the subset of messages included in the view. For example, a first layout can include a calendar representing multiple dates associated with the subset of messages, a second layout can include a subset of the multiple columns the processor determines are important, and a third layout can include urgent information associated with the subset of messages.

The processor can receive the indication to create the custom column, where the custom column includes an indication of a hyperlink associated with the first message among the subset of messages. The custom column can be associated with the database and/or the view. The processor can create the custom column in the view and/or the database and can extract multiple indications of multiple hyperlinks from the subset of messages. The processor can populate the custom column with the multiple hyperlinks. If a message does not have a hyperlink, the corresponding column entry can be left blank.

The processor can receive the indication to create the custom column, where the custom column includes multiple summaries associated with the multiple messages. The processor can create the custom column in the view and the database. The processor can populate the custom column by creating the multiple summaries associated with the multiple messages using artificial intelligence.

The processor can receive the indication to create the view of the multiple messages, where the indication to create the view includes the criterion indicating to select the subset of messages that include one or more attachments. The processor can create a layout among multiple layouts visualizing the subset of messages, where the layout includes a gallery view including thumbnails of the one or more attachments contained in the subset of messages.

The processor can obtain the table including the multiple columns and multiple rows, and determine a relevant column among the multiple columns, where the relevant column includes an actionable item, such as a check-in button, or a column including a translation. The processor can present the relevant column in the second layout.

The processor can create tags and properties using artificial intelligence and create views based on artificial intelligence-generated tags and properties. The processor can obtain from the artificial intelligence a suggestion of a type of the custom column to create, such as a translation, summary, tag, status, actionable item, etc. The processor can create the custom column among the multiple columns using an artificial intelligence. The processor can obtain from the artificial intelligence multiple contents to populate the multiple rows associated with the custom column.

Sharing Structured Views of Email Messages Between Users

Figure 10:
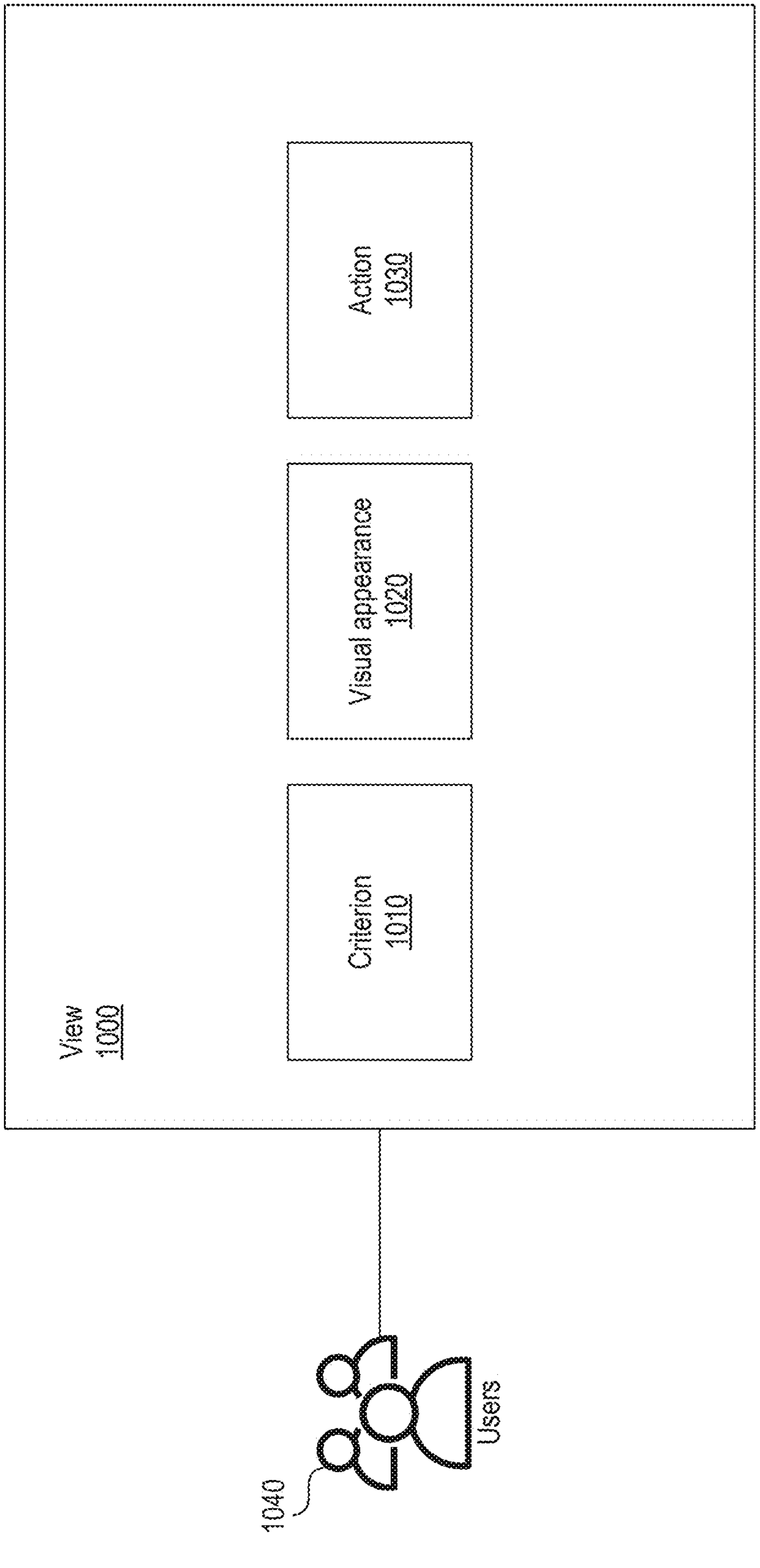
FIG. 10 shows a structure of view.

FIG. 10 shows a structure of view. A traditional email inbox presents incoming email as a table including "from," "to," and "subject" columns. The email inbox is an "event stream" that forms the basis of the disclosed system, but users of the system do not need to look at the "event stream"

directly. Instead, the system organizes the email into the views 1000 that are structured and can be shared among the users of the system.

The view 1000 can have a short name such as "bug reports," "flights," "2024 tax," etc., and can appear on a sidebar as shown in FIGS. 4-7. The view 1000 has internal structure including a criterion 1010, e.g., a rule, a visual appearance 1020, and an action 1030.

The criterion 1010 can determine how new email messages enter the view 1000. The criterion 1010 can be a simple deterministic condition based on "from sender" or "subject contains." For example, the criterion 1010 can state "if the message is from sender 'doctor's office' then include the message in the view." In another example, the criterion 1010 can state "if the subject contains 'tennis' then include the message in the view."

The criterion 1010 can be a more complex deterministic set of heuristics like "contains unsubscribe link." For example, the criterion 1010 can state "if the message content includes an unsubscribe link then include the message in the view."

The criterion 1010 can include text instructions and/or examples of email classifications and can invoke an LLM classifier to classify an incoming message or multiple messages into the view based on the text instructions and/or examples. Specifically, the criterion 1010 can include text instructions such as "if the message relates to my kids, then include the message in the view." The criterion 1010 can include a few examples of messages relating to the kids that should go into the view and can include a few messages that should not go into the view. Based on the text instructions and/or the examples, the LLM classifier can determine whether an unclassified message can enter the view. The LLM classifier can also use properties based on the email itself, e.g. the domain of the sender. For example, the LLM classifier can know information about the domain. For example, the LLM classifier can now that domain name @notion.com relates to technology and/or productivity.

Figure 11A:
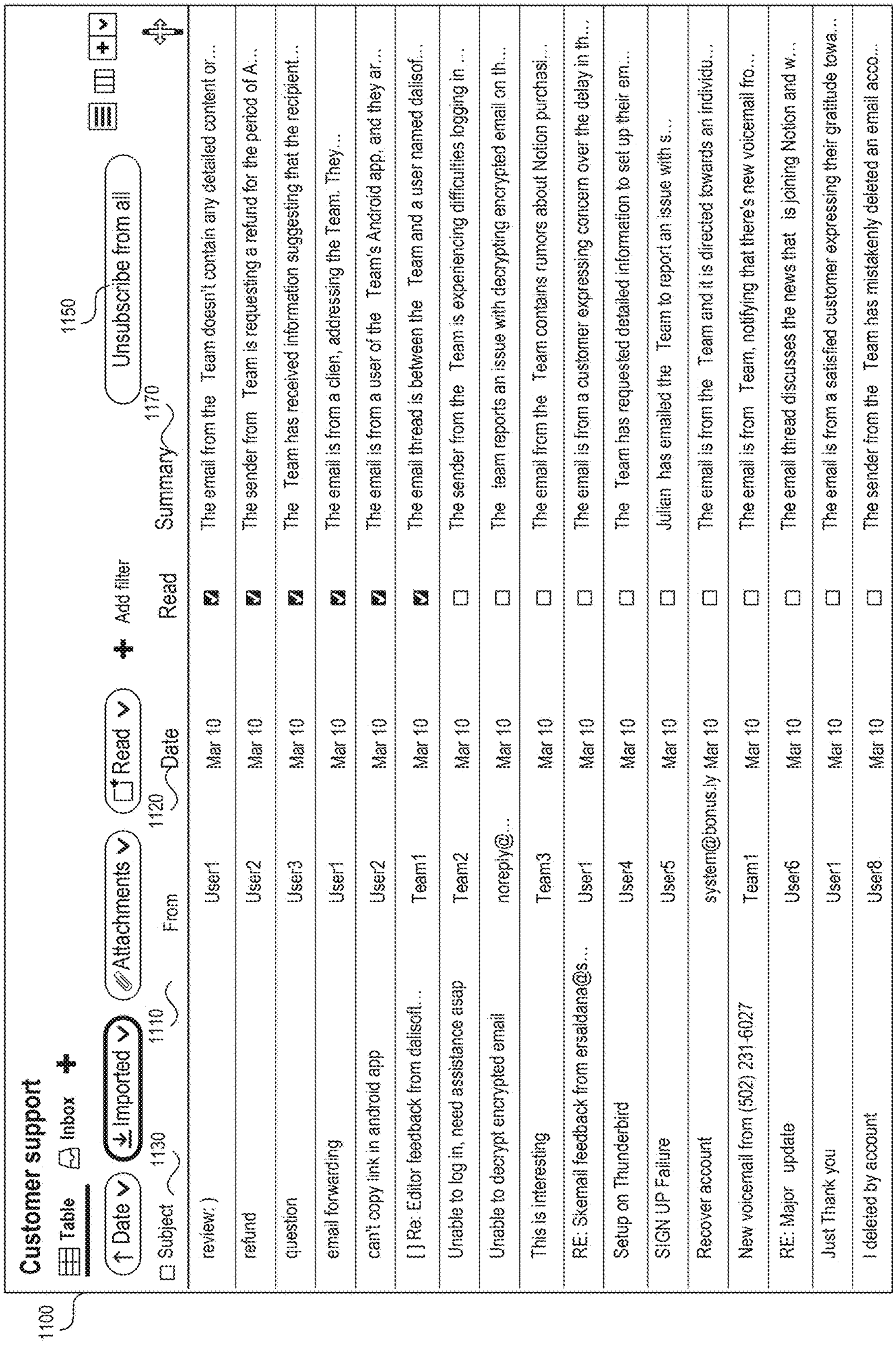
FIGS. 11A and 11B show various views.

The visual appearance 1020 can define the layout of the view. For example, as seen in FIG. 11A, the visual appearance 1020 can include a layout 1100 having columns 1110, 1120, 1130 in FIG. 11A representing mail properties such as from, date, and subject line, respectively. The columns can also include custom columns such as "action items," "hyperlinks," "unsubscribe links," and "LLM-extracted properties" 1170 in FIG. 11A. For example, the hyperlinks column can include hyperlinks containing the email, while the unsubscribe links column can contain the unsubscribe links in the email. The LLM-extracted properties 1170 column can include LLM-generated properties such as summaries, translations, etc.

In another example, the visual appearance 1020 can include custom buttons 1150, as seen in FIG. 11A. When selected, the button 1150 can cause the performing of an action 1030 such as "Unsubscribe from all."

Figure 11B:
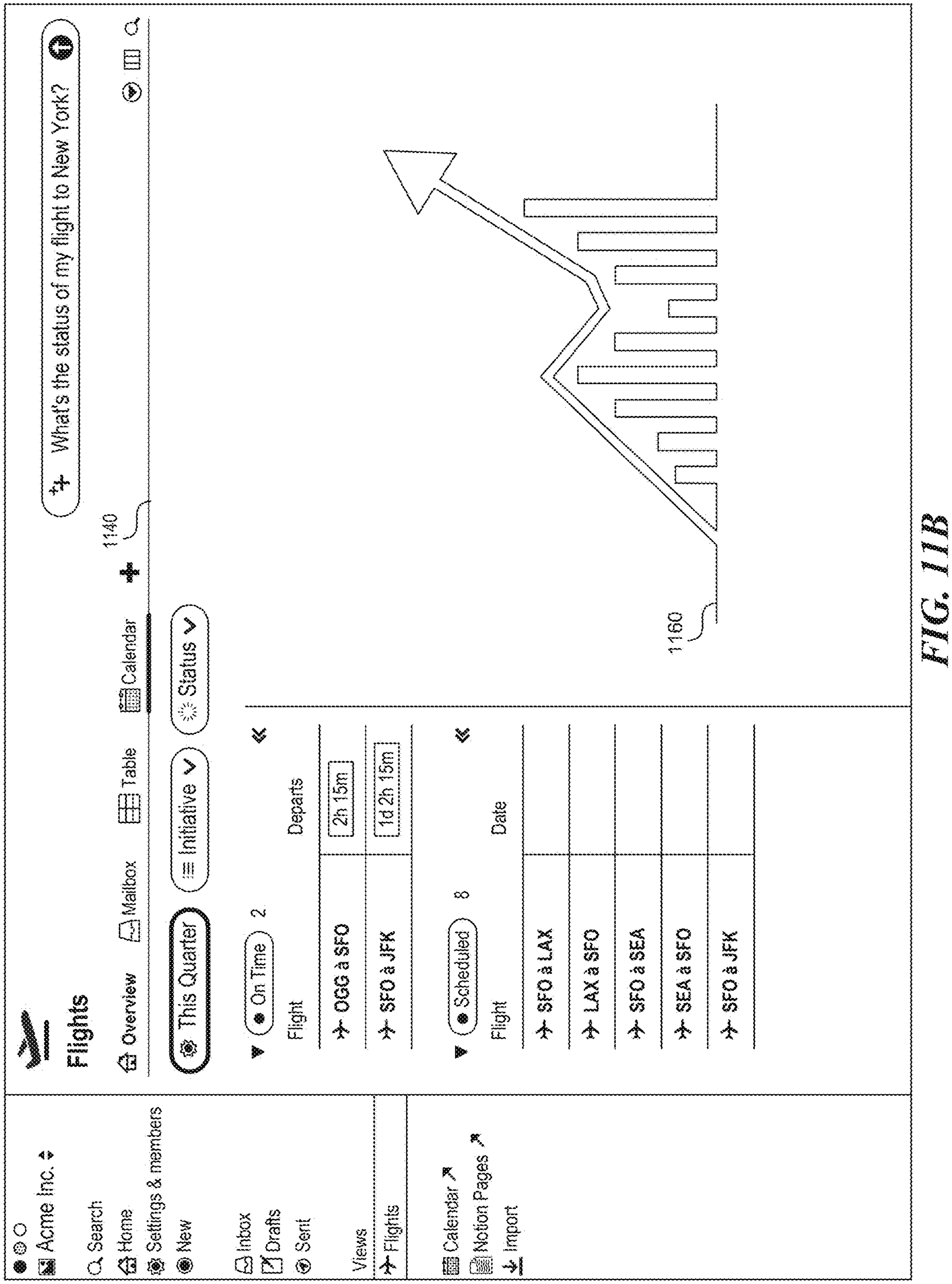

In a third example, the visual appearance 1020 can include a layout 1140 including a custom component like a chart 1160 as seen in FIG. 11B that turns the layout 1140 into a dashboard for the emails included in the view 1000.

The view 1000 can include actions 1030 which trigger automatically when a message enters the view. The action 1030 can include deterministic rules like "archive this" that archive an incoming message when the message enters the view 1000.

The action 1030 can include assistant workflows like responding to support messages by searching the database for answers or filing support tickets. For example, the action 1030 can invoke a software program, e.g., an application, or an artificial intelligence to examine an email and determine whether the email is a request for support. If the email is the request for support, the action 1030 can invoke another software program to search a database storing prior knowledge and determine an appropriate response to the request for support. Alternatively, the action 1030 can invoke an artificial intelligence, such as generative artificial intelligence, to respond to the request. If no appropriate response is found upon searching the database or invoking the artificial intelligence, the action 1030 can create a support ticket based on the request for support. The support ticket can be further analyzed by the support team.

The view 1000 and the internal structure including the criterion 1010, the visual appearance 1020, and the action 1030 can be shared among multiple users 1040 of the system. In addition, if the view is associated with multiple recipients, the internal structure of the view 1000, and the content of the email messages can be shared among multiple recipients. For example, if an email is sent to an email list X, a recipient listed on the email list can create the view with the criterion filtering received email messages sent to the email list X into the view. Consequently, the recipient can share the email messages, the view, its visual appearance, and actions with other recipients in the email list X.

FIGS. 11A and 11B show various views. FIG. 11A shows a view 1000 representing a table with custom columns 1170, while FIG. 11B shows a view 1000 including a chart 1160. The chart 1160 can be attachment in an email or can be an analysis of all the emails in the view 1000.

In addition, as described in this application, an email message can contain embeddings and links to other features of the system 100 in FIG. 1. For example, an email message can contain a preview of a document in the system 100. In addition, a wiki in the system can embed an email message, or a paragraph within the email.

Figure 12:
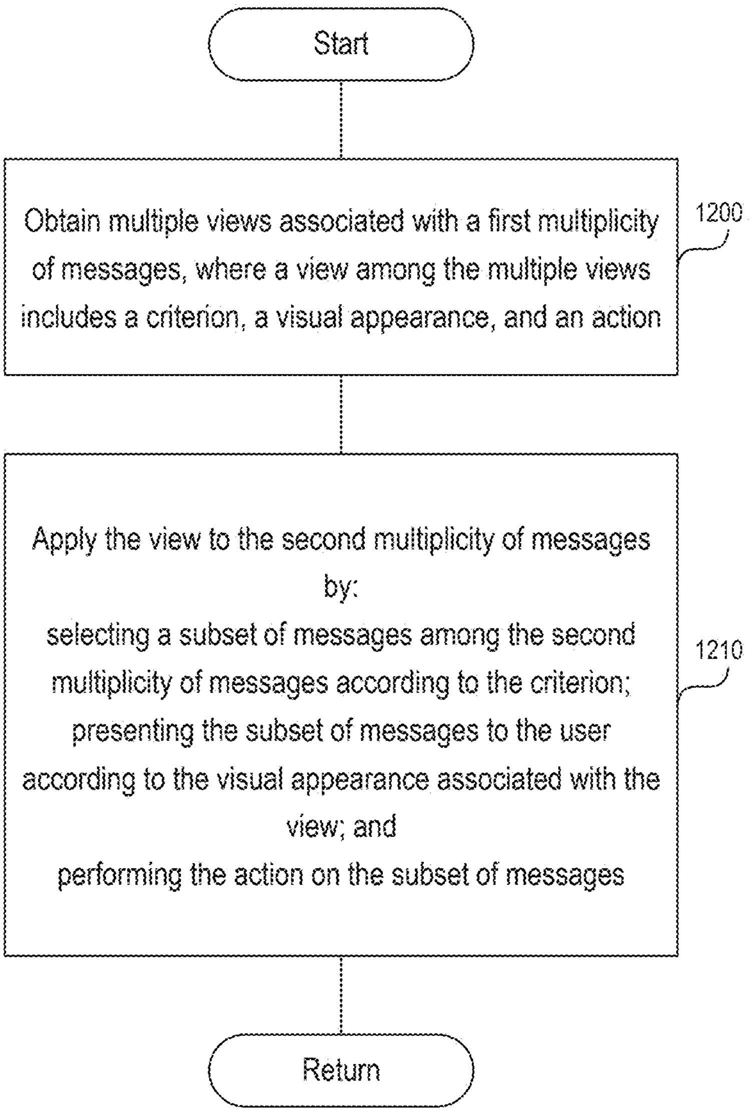
FIG. 12 is a flowchart of a method to share structured views of email messages between users.

FIG. 12 is a flowchart of a method to share structured views of email messages between users. A hardware or software processor executing instructions described in this application can in step 1200 obtain multiple views associated with a first multiplicity of messages. A view among the multiple views can have structure and include a criterion, a visual appearance, and an action. The criterion defines a message to include in the view. The action is configured to trigger automatically when the message is included in the view.

The processor can provide a user interface including the multiple views to a user associated with a second multiplicity of messages. The processor can receive an indication to apply the view to the second multiplicity of messages, by, for example, the user selecting the view in the user interface.

In step 1210, the processor can apply the view to the second multiplicity of messages by performing the following steps. First, the processor can select a subset of messages among the second multiplicity of messages according to the criterion. Second, the processor can present the subset of messages to the user according to the visual appearance associated with the view. Third, the processor can perform the action on the subset of messages.

In one embodiment, to select a subset of messages, the processor can obtain the criterion indicating to select the subset of messages if the subset of messages includes an unsubscribe link. The processor can include a second message in the subset of messages when the second message includes the unsubscribe link.

In another embodiment, to select a subset of messages, the processor can obtain the criterion including a natural language instruction and/or an example classification according to the natural language instruction. The processor can provide the natural language instruction and the second multiplicity of messages to a large language model. The processor can obtain from the large language model the subset of messages.

To present the subset of messages, the processor can obtain the visual appearance, where the visual appearance defines a layout of the subset of messages. The layout can include representing the subset of messages in a calendar or representing a custom property extracted from the message. The custom property can be extracted using artificial intelligence and can be a summary, a translation, a classification, etc., associated with the message. The processor can present the custom property as a custom column. Finally, the processor can present the subset of messages using the layout.

To perform the action on the subset of messages, the processor can obtain the action indicating to archive the subset of messages or to unsubscribe from the subset of messages. The processor can unsubscribe from the subset of messages or archive the subset of messages.

In addition to sharing the view structure, users can share both the view structure and the content of the email. To do that, the processor can obtain the view defining the criterion selecting a first subset of messages among the first multiplicity of messages, where the criterion is based on a receiver of the first subset of messages. For example, the criterion can filter the messages into the view if they are sent to a particular email list. The receiver, e.g., the email list, can include a first user associated with the first multiplicity of messages and the user associated with the second multiplicity of messages. The processor can provide the first subset of messages, including the content, to the user associated with the second multiplicity of messages, where the first subset of messages is presented according to the visual appearance associated with the view.

To perform the action on the subset of messages, the processor can determine whether the message is a request for support. The processor can obtain a history of support requests and a corresponding history of responses to the history of support requests. The processor can determine whether the request for support matches a support request in the history of support requests. Upon determining that the request for support matches the support requests in the history of support requests, the processor can obtain a corresponding response in the history of responses. The processor can provide the corresponding response to the request for support. Upon determining that the request for support does not match the support request in the history of support requests, the processor can create a ticket indicating the request for support. The ticket, in turn, can indicate that further analysis is needed.

Automatically Suggesting a View to Apply to an Inbox

Figure 13:
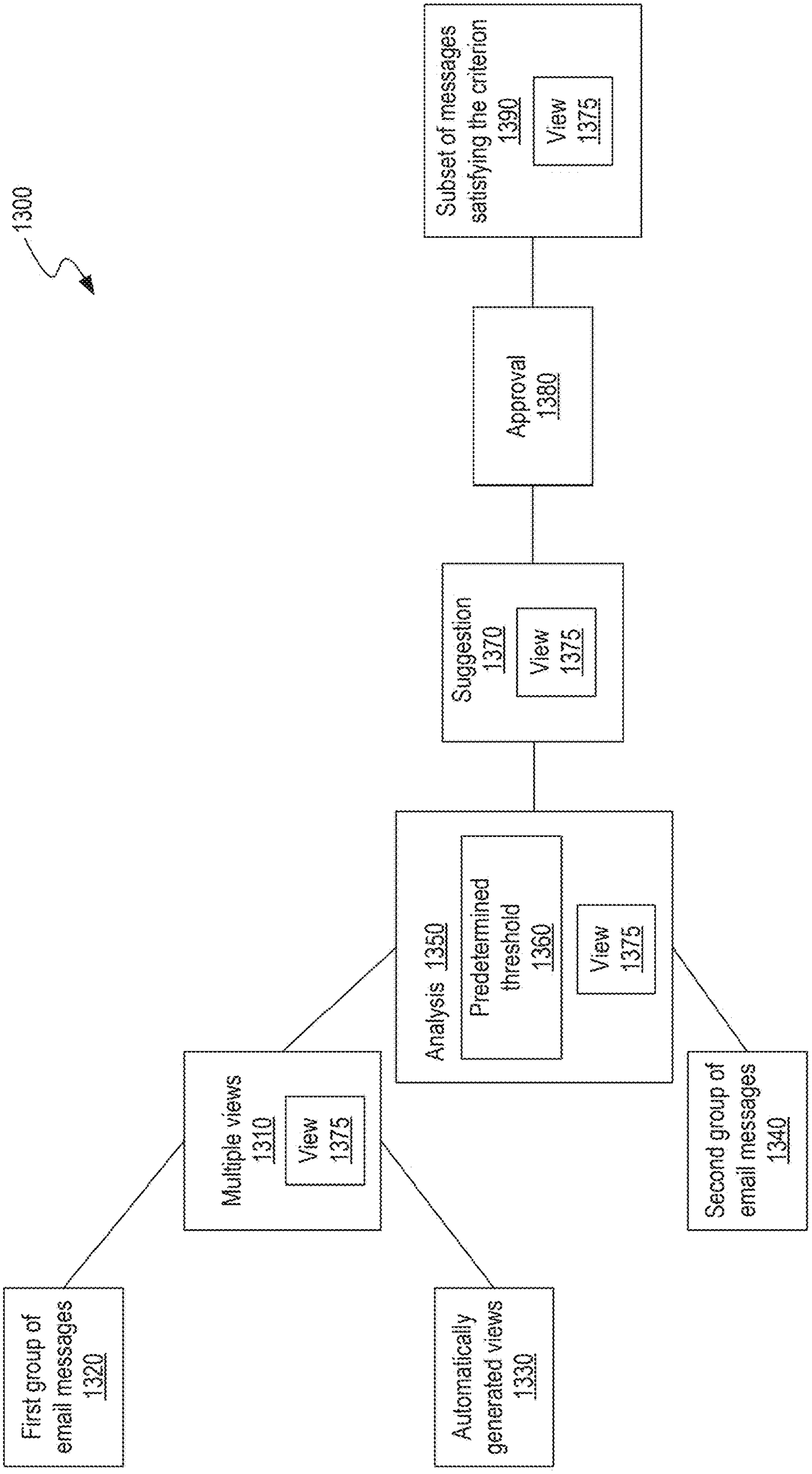
FIG. 13 shows a system to automatically suggest a view to apply to an inbox.

FIG. 13 shows a system to automatically suggest a view to apply to an inbox. The system 1300 can obtain multiple views 1310 that are structured from a first group of email messages 1320 that have been structured by a user or from automatically generated views 1330. The automatically generated views 1330 can be generated by a program or artificial intelligence that generates new views based on previously existing views, emails in a user's inbox, and/or most frequently used views. The system 1300 can also suggest views from a template marketplace, e.g. contributions from other users or templates shared among members of the same organization.

Further, the system can obtain a second group of email messages 1340 that can be associated with another user. In analysis 1350, the system can analyze the second group of email messages 1340 to determine which of the multiple views 1310 are applicable to the second group of email messages 1340. For example, the analysis 1350 can apply the criteria contained in the multiple views 1310 to determine how many messages among the second group of email messages 1340 satisfy the criteria in each view. The analysis 1350 can compare the number of messages that then satisfy the criteria in each view to a predetermined threshold 1360. For example, the predetermined threshold 1360 can indicate that if more than 20 messages satisfy the criteria, or more than 5% of the messages in the second group of email messages 1340 satisfy the criteria, the system 1300 can generate the suggestion 1370 suggesting applying the view 1375 to the second group of email messages 1340.

If the system 1300 receives the approval 1380 to apply the view 1375 to the second group of email messages 1340, the system 1300 can present the subset of messages 1390 that satisfy the criteria of the view 1375 according to the visual appearance included in the view 1375.

Figure 14:
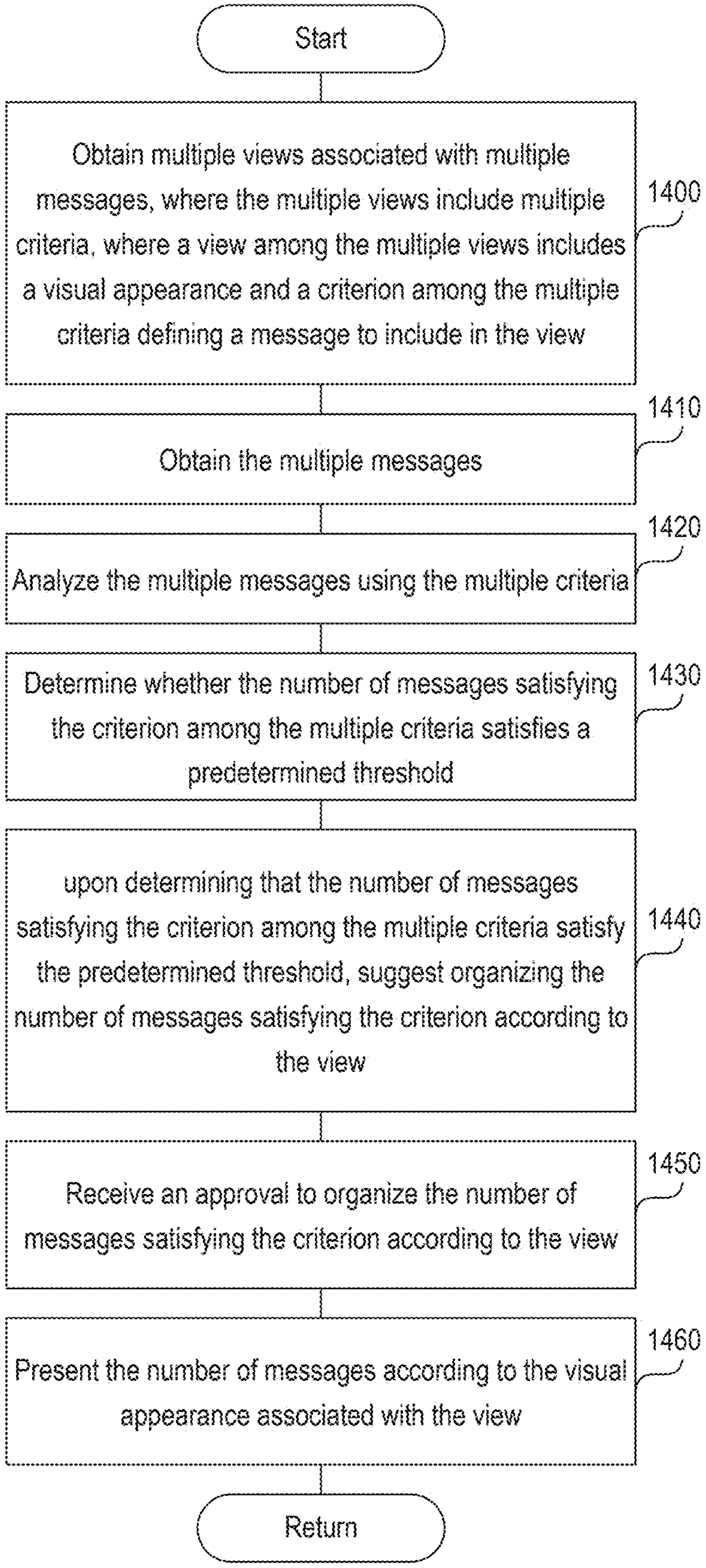
FIG. 14 is a flowchart of a method to automatically suggest views relevant to an email inbox.

FIG. 14 is a flowchart of a method to automatically suggest views relevant to an email inbox. A hardware or software processor described in this application can in step 1400 obtain multiple views associated with multiple messages. A view among the multiple views can include a visual appearance and a criterion among multiple criteria defining a message to include in the view.

In step 1410, the processor can obtain the multiple messages. This step can be performed during onboarding of a new group of messages or as new messages come into the inbox.

In step 1420, the processor can analyze the multiple messages using the multiple criteria to determine the number of messages satisfying the criterion among the multiple criteria.

In step 1430, the processor can determine whether the number of messages satisfying the criterion among the multiple criteria satisfies a predetermined threshold. The predetermined threshold can be expressed as an absolute number such as 50 messages, or as a percentage of the total number of messages in the inbox such as 1%.

In step 1440, upon determining that the number of messages satisfying the criterion among the multiple criteria satisfy the predetermined threshold, the processor can suggest organizing the number of messages satisfying the criterion according to the view.

In step 1450, the processor can receive an approval to organize the number of messages satisfying the criterion according to the view. Upon receiving the approval, the processor can show the view in the user's inbox sidebar so they can navigate to the view in the future.

In step 1460, the processor can present the number of messages according to the visual appearance associated with the view.

To obtain the multiple views, the processor can obtain the multiple messages, where a message in the multiple messages includes multiple properties including a sender, a receiver, a subject, and a content property relating to a content of the message. The content property can include a summary, a translation, a link, an attachment included in the message, a status column, a column containing actionable items extracted from the email, etc. The translation column can include a summary of the email translated into the appropriate language, subject line translated into the appropriate language, text of email translated into the appropriate language, etc. The actionable item columns can be columns that include hyperlinks to pages, such as check-in buttons. The processor can automatically generate the visual appearance associated with the view, where the visual appearance simplifies the multiple properties by presenting a subset of the multiple properties including the subject and the content property.

The processor can obtain multiple views associated with the multiple messages, where the view among the multiple views includes a custom column having a type among the multiple types including a summary type, a tag type, a status type, or an actionable item. The processor can analyze the multiple messages to determine the number of messages associated with the type among the multiple types. The processor can determine whether the number of messages associated with the type among the multiple types satisfies a second predetermined threshold. The second predetermined threshold can include the number of messages such as 50 messages, or a percentage of messages such as over 90% of messages. Upon determining that the number of messages associated with the type among the multiple types satisfies the second predetermined threshold, the processor can create in the view the custom column including the type among the multiple types. Alternatively, the processor can suggest the custom column to create and wait for the user to approve the creation of the custom column. The processor can populate the custom column with entries corresponding to the type among the multiple types.

To present the subset of messages, the processor can obtain the visual appearance defining a layout of the subset of messages. The layout can include representing the subset of messages in a calendar. The processor can present the subset of messages using the layout.

The processor can receive a natural language prompt describing a second view associated with the multiple messages to create. The processor can extract from the natural language prompt an indication of a second criterion associated with the second view. In addition, the processor can also extract indication of the visual appearance, such as a pie chart, histogram, a timeline view, calendar review, etc. The processor can create the second criterion associated with the second view. The processor can create the second view by applying the second criterion to the multiple messages to obtain a second subset of messages. The processor can present the second subset of messages.

The processor can obtain the view including an action and can perform the action automatically when the message is included in the view.

The processor can determine whether the message is a request for support. The processor can obtain a history of support requests and a corresponding history of responses to the history of support requests. The processor can determine whether the request for support matches a support request in the history of support requests. Upon determining that the request for support matches the support requests in the history of support requests, the processor can obtain a corresponding response in the history of responses. The processor can provide the corresponding response to the request for support. Upon determining that the request for support does not match the support request in the history of support requests, the processor can create a ticket indicating the request for support.

Providing AI Generated Content in an Email User Interface

Figure 15:
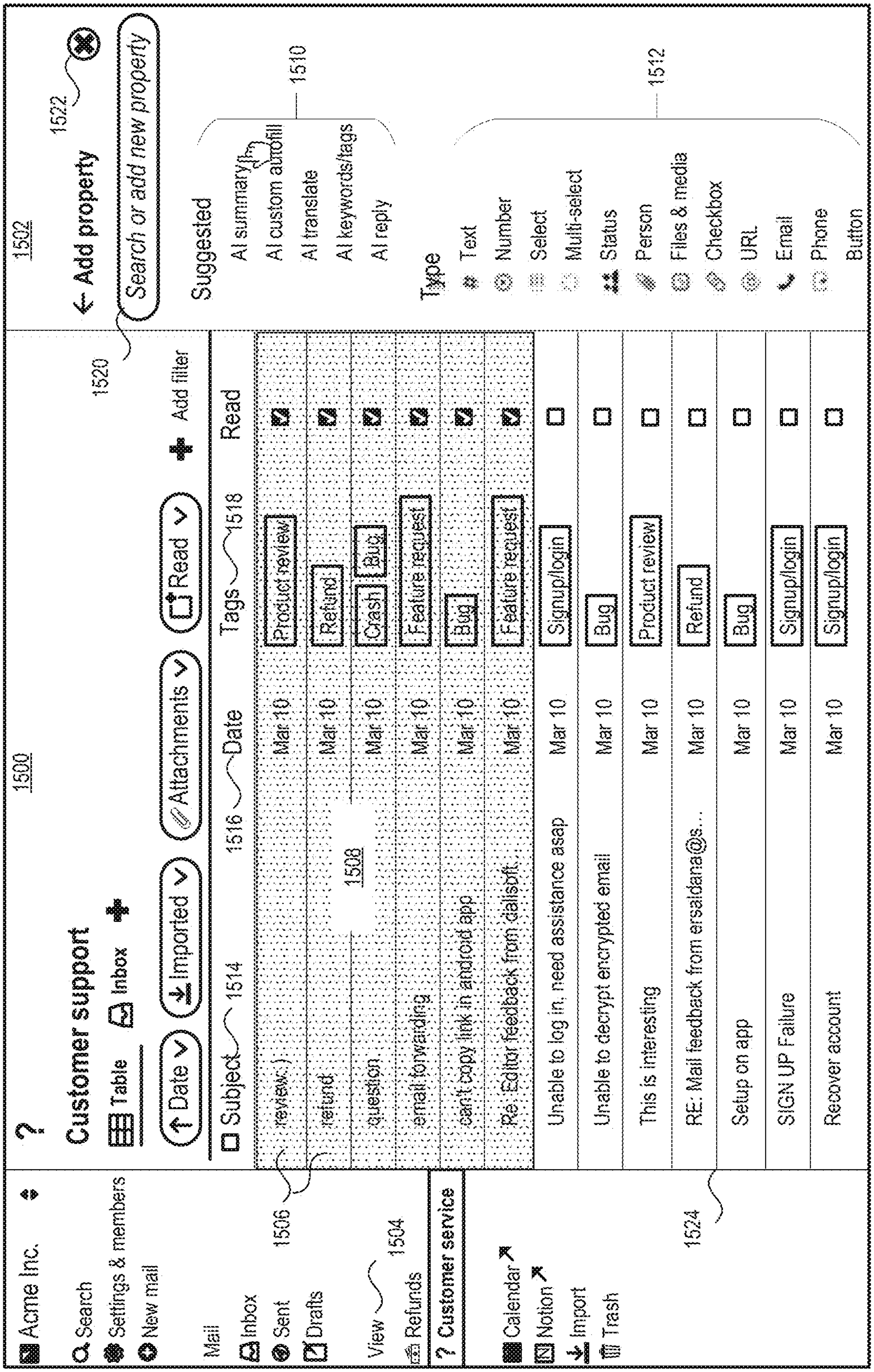
FIG. 15 shows an email user interface with an integrated generative artificial intelligence (AI) tool.

FIG. 15 shows an email user interface 1500 with an integrated generative AI email tool 1502. The email user interface 1500 can be associated with an inbox (e.g., the inbox 400 described with respect to FIG. 4). In some implementations, the user email user interface 1500 corresponds to the user interface 490 in FIG. 4. The email user interface 1500 includes multiple email messages (e.g., email messages 1506) arranged in a table 1524 with multiple columns. The columns correspond to properties of the email messages (e.g., a subject column 1514, a date column 1516, tags (keywords) column 1518). In some implementations, the email user interface 1500 includes email from a particular view (e.g., a view 1504 corresponding to the view 470 described with respect to FIG. 4). For example, the email user interface 1500 includes emails that are associated with a subset of all email messages 1506 included in the inbox. In some implementations, the email user interface 1500 includes all email messages 1506 of the inbox.

In FIG. 15, the email user interface 1500 includes the AI email tool 1502 (or a view customization tool 1502). In some implementations, the AI email tool 1502 can be opened as a sidebar or a pop-up window (e.g., in response to an input on a control element or an icon) while concurrently displaying the table 1524 of email messages 1506 on the email user interface 1500. The AI email tool can be closed (e.g., by a user input on a control element 1522). The AI email tool 1502 is configured to allow a user to add AI generated content to the email user interface. The AI generated content can be added to the table 1524 of email messages 1506. The content is generated by an AI system (e.g., the AI tool 104 in FIG. 1) based on content of the email messages 1506 and instructions (e.g., prompts) provided by a user. The instructions can include default instructions such as summarization or translation of the content of the email messages. The content of the email messages 1506 can include all email messages 1506 or a subset of the messages (e.g., a subset 1508 highlighted with a pattern in FIG. 15). The subset 1508 can be selected based on a user input (e.g., the user selects the subset of email messages by activating the subset 1508 of the email messages). Alternatively, the selection is performed based a criterion that is included in the instructions. For example, the subset 1508 includes email messages 1506 that are marked as "Read," as shown. As other examples, the subset 1508 can be selected based on a particular tag, a name of a sender, a date, a size, or whether the email includes an attachment.

The AI email tool 1502 can include a prompt block 1520 that enables the user to provide instructions to an AI system to perform functions in accordance with the instructions. A user can provide an input including the instructions on the prompt block 1520 (e.g., by typing text to the prompt block and pressing enter) to send them to the AI system for processing. The AI email tool 1502 can also include predefined prompts 1510. The instructions can define a type of the content to be generated by the AI system. The type can include, for example, a summary of the email content, a customized autofill, a translation, keywords/tags, or a reply. As shown, in some implementations, the AI email tool 1502 can provide suggestions of the different predefined prompts 1510 for easy access to the user. The suggested prompts can be determined based on the content of the email messages, user's profile or user history, most frequent use of the prompts, etc. The AI email tool 1502 can also include suggested property types 1512 for the content to be added to the table 1524 of email messages 1506. <<Inventors, can you explain the function of the list of types 1512 labeled as "Type.">> The suggested property types 1512 can include AI or non-AI properties (or a combination of AI and non-AI properties) that facilitate productivity and organization of the email messages 1506. For example, the suggested property types 1512 can allow a user to add a priority attribute to table 1524 to manually or automatically triage the priority of incoming messages. The automatic triage can be based on computation by the AI system.

In response to providing a prompt, either by an input to indicate a prompt from the predefined prompts 1510 or defining a prompt on the prompt block 1520, and a selection of all or a subset of the email messages 1506, the system sends the prompt and the content of the selected email messages 1506 to the AI system. The AI system then generates content based on the prompt and the content of the selected email messages 1506. The AI system provides the generated content to the inbox to be displayed on the email interface 1500. For example, in an instance that the provided prompt includes instruction for generating summaries of the selected email messages (i.e., "AI summary" prompt), the table 1524 of the email messages 1506 in the email user interface 1500 will be modified to include a column including the AI generated summaries, as is shown in FIG. 16.

Figure 16:
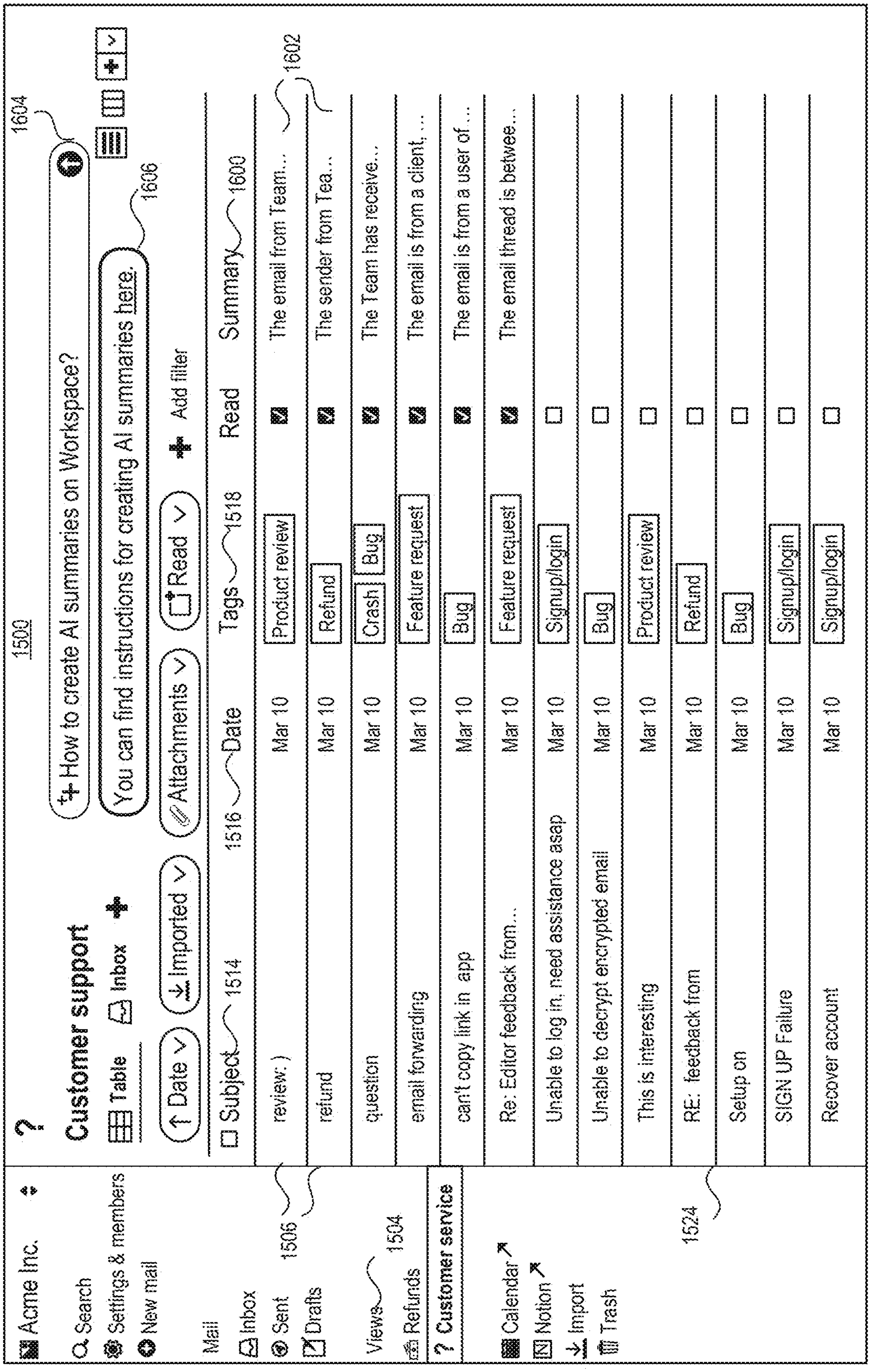
FIG. 16 shows an email user interface with an AI generated content column.

FIG. 16 shows the email user interface 1500 with an AI generated content column 1600. In FIG. 16, the AI generated content column 1600 includes AI generated summaries 1602 that are generated based on the content of each of selected email messages 1506. Similarly, a new column could be added to the table 1524 of the email messages 1506 that includes any content generated by the AI system (e.g., the tags column 1518 can be generated by AI). As an example, in response to a user input to select the "AI Reply" prompt on the AI email tool 1502, an AI generated content column can include one or more replies generated for each of the selected email messages 1506. As another example, in response to a user input to select the "AI translate" prompt on the AI email tool 1502, an AI generated content column can include translations generated for each of the selected email messages 1506 in the indicated language (e.g., French, Spanish, Japanese). In some implementations, multiple columns can be added in response to a single prompt that includes instructions to generate content of multiple types. As shown, in FIG. 16, the AI email tool 1502 is no longer displayed and the table 1524 of the email messages 1506 populates the width of the email user interface 1500.

In some implementations, the email user interface 1500 can include a question & answer (Q&A) prompt block 1604. The Q&A prompt block 1604 can be associated with instructions to cause the AI system to create an answer to a question provided as an input from a user on the Q&A prompt. For example, the question can include natural language that can be interpreted based on an LLM (or other machine learning model). The system can further generate an answer to the question using the LLM and relevant content. In particular, the Q&A prompt block 1604 can provide answers to any questions using information across the email message user interface 1700, the associated inbox (e.g., the inbox 405), the associated workspace (e.g., any of the user applications 102 in FIG. 1) or sources outside the workspace (e.g., the Internet). In FIG. 16, a user has provided an input including a question (e.g., a text input) on the Q&A prompt ("How to create AI summaries on Workspace?"). In answer to the input, the AI system has generated a text content to respond to the question and displays it on an interface element 1606 while concurrently displaying the email messages 1506. In FIG. 16, the interface element 1606 includes an answer ("You can find instructions for creating AI summaries here"). The answer can also include a Uniform Resource Locator (URL) link connected to a location of a document including instructions for creating AI summaries.

In some implementations, the email user interface 1500 can include a prompt for performing a content search. The content search can be done, for example, based on keywords and can be performed across the email user interface 1700, the associated inbox, the associated workspace, or sources outside the workspace (e.g., the Internet).

In some implementations, an integrated generative AI tool can be used for providing AI generated email content in an email message that is displayed on an email message user interface. An exemplary email message user interface 1700 including an integrated generative AI tool is shown. The AI tool can be caused to create a new email message, to add content to an existing email message, to format or modify content of an existing email message, or to create a reply to a received email message.

Figure 17:
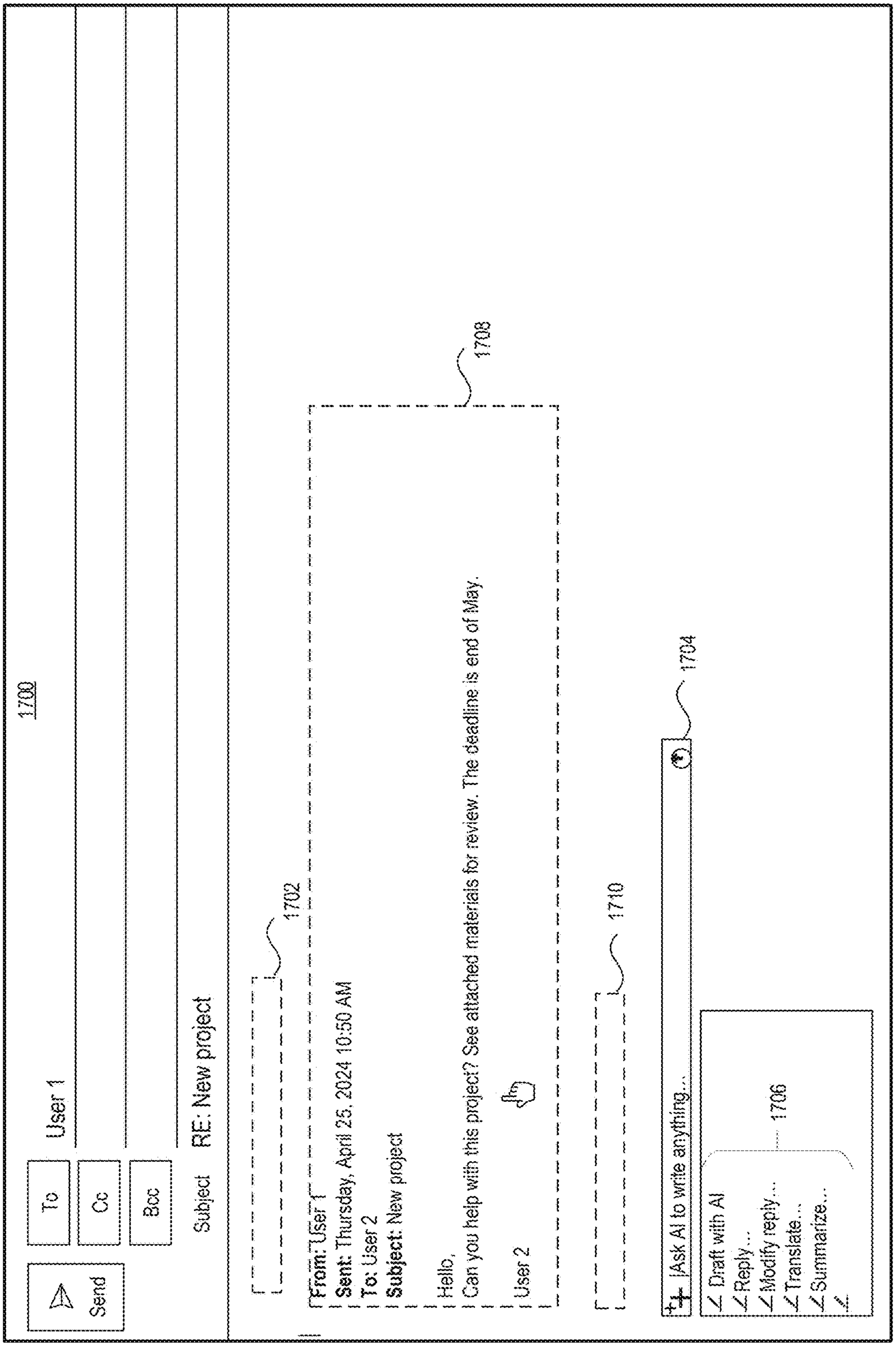
FIG. 17 shows an email reply user interface including a prompt block for generating email content.

FIG. 17 shows an email message user interface 1700 including a prompt block 1704 for generating email content. The email message user interface 1700 corresponds to a user interface for replying to an email message. For example, a user has provided an input on an email message of the received email messages 1506 in the email user interface 1500 indicating to generate a reply to the email message. The email message user interface 1700 includes the content of the received email message (e.g., content 1708), which indicates, for example, a sender ("User1"), a date and time of receiving the email message ("Sent"), a receiver ("User2"), a subject ("New project"), and content of the received message ("Hello, Can you help . . . "). The email message user interface 1700 also includes other information that can be automatically populated based on the indication that the user is generating a reply to the email (e.g., the message will be send to "User1") and includes a subject line that indicates that the email message is a reply to a received email message ("Re: New project").

The email message user interface 1700 also includes a prompt block 1704. The prompt block 1704 can be displayed on the email message user interface 1700 automatically while the email message user interface 1700 is displayed. Alternatively, the prompt block 1704 can be displayed in response to an input to display and/or activate a prompt block. The input can include, e.g., a right or left click on a location on the email message user interface 1700.

The prompt block 1704 can correspond to the prompt block 1520 in that it can enable the user to provide instructions to the AI system to perform functions to create content on the email message user interface 1700 based on an input on the prompt block 1704. A user can provide such instructions on the prompt block 1704. The instructions can identify a type of content to be created as well as existing content that can be used by the AI system to generate the content of the identified type. For example, in an instance that the content to be created is a reply to a received email, the existing content can include the content 1708. As another example, in an instance that the content to be created is a new message, the existing content can include information about a receiver (e.g., a receiver corresponding to an individual user or a group), a topic for the new message (e.g., generating an invite to a meeting), email correspondence history from the associated inbox between a sender and a receiver, and/or a content from a source external to the email inbox (e.g., accessed via a URL link displayed on the page or included in the input on the prompt block). The content from the external source can be content from the workspace (e.g., content of pages) associated with the email inbox or anywhere on the Internet. In response to the input, the system can transmit the instructions and the existing content to the AI system. The system receives the AI generated content from the AI system and displays the AI generated content on the email user interface 1700.

The AI email tool 1502 can also include predefined prompts 1706. In some implementations, the predefined prompts 1706 are provided on a drop-down menu displayed adjacent to the prompt block 1704. Exemplary predefined prompts in FIG. 17 include prompts for drafting a new message ("Draft with AI"), replying to an existing email, modifying an existing reply, translating the existing reply (or content 1708), and summarizing the content.

In some implementations, the input on the prompt block can identify a location for displaying the AI generated content on the email message user interface 1700 (e.g., a location 1702 or location 1710). Alternatively, the system can determine a location for displaying the AI generated content based on the type of content defined in the prompt. For example, in an instance that the type of content identified in the prompt includes a reply, the system can display the AI generated reply content at the location 1702, which is above the received email content 1708. The AI generated content at the location 1702 can be displayed as an in-page content such that the content can populate an area on the email message user interface by expanding the area at the location 1702 (e.g., pushing the content 1708 to be lower on the email message user interface 1700). As another example, in an instance that the type of content is a summary of the received email content 1708, the system can display the AI generated summary at the location 1710 below the content 1708. In some implementations, the AI generated content can be displayed on the prompt block 1704 so that the AI generated content replaces the content included in the prompt block 1704. The prompt block 1704 can cease to be displayed after the AI generated content has been created and displayed on the email user interface 1700.

Figure 18:
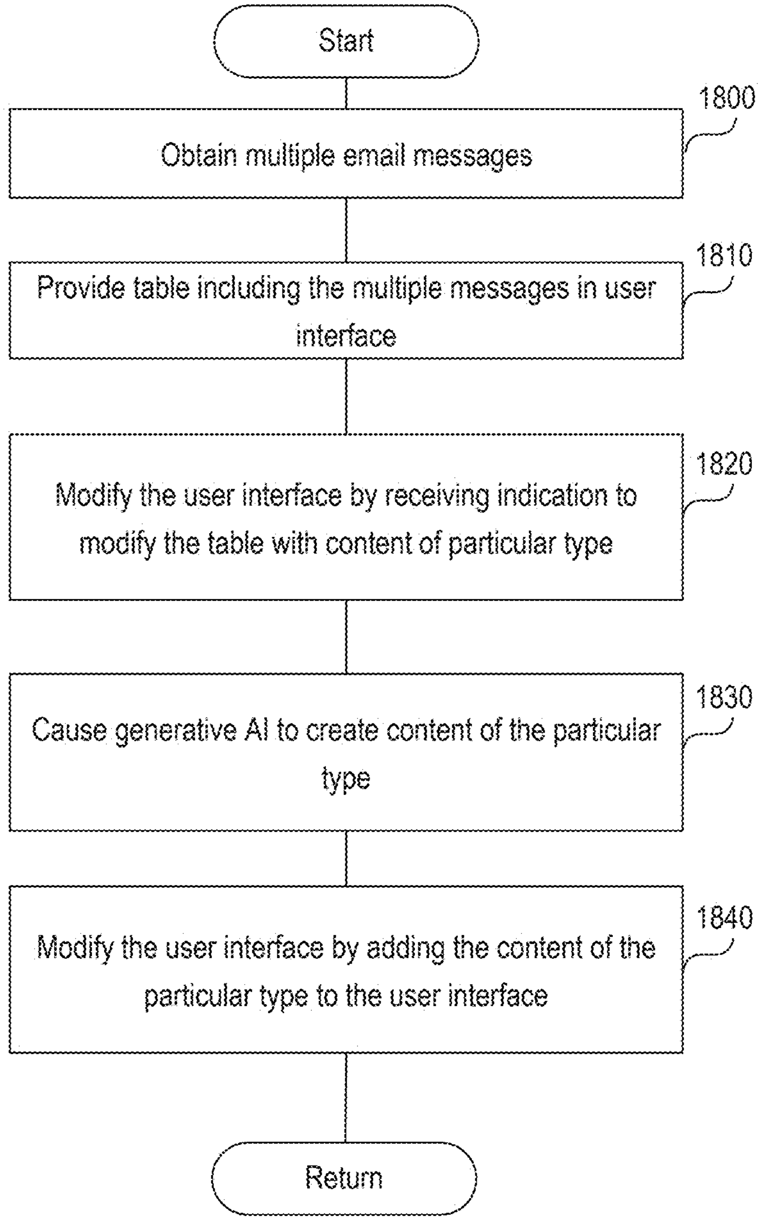
FIG. 18 is a flowchart of a method for providing AI generated content in an email user interface.

FIG. 18 is a flowchart of a method for providing AI generated content in an email user interface (e.g., the email user interface 1500). A hardware or software processor described in this application can in step 1800 obtain multiple email messages (e.g., the email messages 1506). An email message among the multiple email messages includes multiple properties.

At 1810, the system can provide a table including the multiple email messages in a user interface. The table can include multiple rows and multiple columns, where the multiple columns correspond to respective properties of the multiple properties and a row corresponds to one or more email messages. The table can be configured to be modified by content created by a generative AI system. For example, in FIG. 15 the email messages 1506 are displayed in the table 1524 where each row corresponds to an email message and each column corresponds to a property associated with email messages. For example, in FIG. 15 the columns correspond to properties of the email messages (e.g., the subject column 1514, the date column 1516, the tags (keywords) column 1518).

At 1820, the system can modify the user interface by receiving an indication to modify the table with content of a particular type (e.g., a user input on the prompt block 1520 in FIG. 15). The indication can include a selection of one or more rows of the multiple rows in the table wherein the selection of the one or more rows is across at least part of the multiple columns of the table. For example, in FIG. 15, the selection includes the subset 1508 of the email messages 1506. The selection is indicated with a highlight (e.g., the patterned background on the subset 1508).

At 1830, the system can cause the generative AI system to create content of the particular type based on the indication and the selection of the one or more rows.

At 1840, the system can modify the user interface by adding the content of the particular type created by the generative AI system to the user interface. In some implementations, adding the content created by the generative AI system to the selected one or more rows includes adding a new column to the table (e.g., AI generated column 1600 of table 1524 in FIG. 16) and populating a portion of the new column with the content.

In some implementations, the particular type of content corresponds to a summary. Causing the generative AI system to generate the content of the particular type can include causing an LLM of the generative AI system to generate one or more summaries based on the respective selected one or more rows of the table. For example, in FIG. 16, the column 1600 is added to the table 1524. The column 1600 includes AI generated summaries 1602 generated by the AI system for each of the email messages in the subset 1508.

In some implementations, the particular type of content can correspond to keywords. Causing the generative AI system to generate the content of the particular type can include causing an LLM of the generative AI system to generate one or more keywords based on the respective selected one or more rows of the table.

In some implementations, the particular type of content corresponds to an automated email reply. Causing the generative AI system to generate the content of the particular type can include causing a generative LLM of the generative AI system to generate one or more replies to the one or more emails associated with the one or more selected rows based on the selected one or more rows of the table.

In some implementations, the system provides a prompt block (e.g., the Q&A prompt block 1604 in FIG. 16) configured to initiate a generative process to create content to be displayed on the user interface. The system can receive on the prompt block an indication (e.g., a text input) including instructions to create an answer to a question based on the obtained multiple email messages. The system can provide the obtained multiple email messages and the instruction as input to the generative AI system. The system can cause the generative AI system to create the answer to the question based on the obtained email messages and provide the answer on the user interface (e.g., the interface element 1606 includes the answer to the questions provided in the Q&A prompt block 1604).

In some implementations, the system is associated with a workspace (e.g., the system 100 in FIG. 1). The system can provide the prompt block configured to initiate a generative process to create content to be displayed on the user interface. The system can receive on the prompt block an indication including instructions to create an answer to a question based on the obtained multiple email messages and data stored in the workspace (e.g., data associated with the applications 102 in FIG. 1). The system can provide the obtained multiple email messages and the instruction as input to the generative AI system and cause the generative AI system to create the answer to the question based on the obtained email messages and the data stored in the workspace. The system can provide the answer on the user interface.

In some implementations, the indication includes instructions to create an answer to a question based on the obtained multiple email messages, data stored in the workspace, and data from a source that is external to the workspace (e.g., the Internet). The system can provide the obtained multiple email messages and the instruction as input to the generative AI system. The system can cause the generative AI system to create the answer to the question based on the obtained email messages, the data stored in the workspace, and the data from a source that is external to the workspace and provide the answer on the user interface.

In some implementations, the system is further caused to receive an indication to generate an email message. The system can provide a user interface for generating the email message (e.g., the email message user interface in FIG. 17). The system can provide a prompt block (e.g., the prompt block 1704) including instructions for initiating a generative process to create the email message on the email message user interface. The system can provide the instructions as input to the generative AI system and cause the generative AI system to create the email message. The system can provide the created email message on the user interface (e.g., the email message can be displayed on the email message user interface 1700).

In some implementations, the system is further caused to receive an indication to generate a reply to a received email message on a first row of the multiple rows (e.g., an email message in the table 1524 in FIG. 15). The system can provide an email message user interface (e.g., the email message user interface 1700) for generating the reply to the received email message. The email message user interface can include content of the received email message (e.g., the content 1708). The system can provide a prompt block (e.g., the prompt block 1704) including instructions for initiating a generative process to create the reply on the email message user interface. The system can provide the content of the received email message and the instructions as input to the generative AI system and cause the generative AI system to create the reply to the received email based on the content of the email message. The system can provide the created reply on the user interface (e.g., the reply can be displayed on the email message user interface at the location 1702 or the location 1710).

Providing Graphical Representations of Email Content

Figure 19:
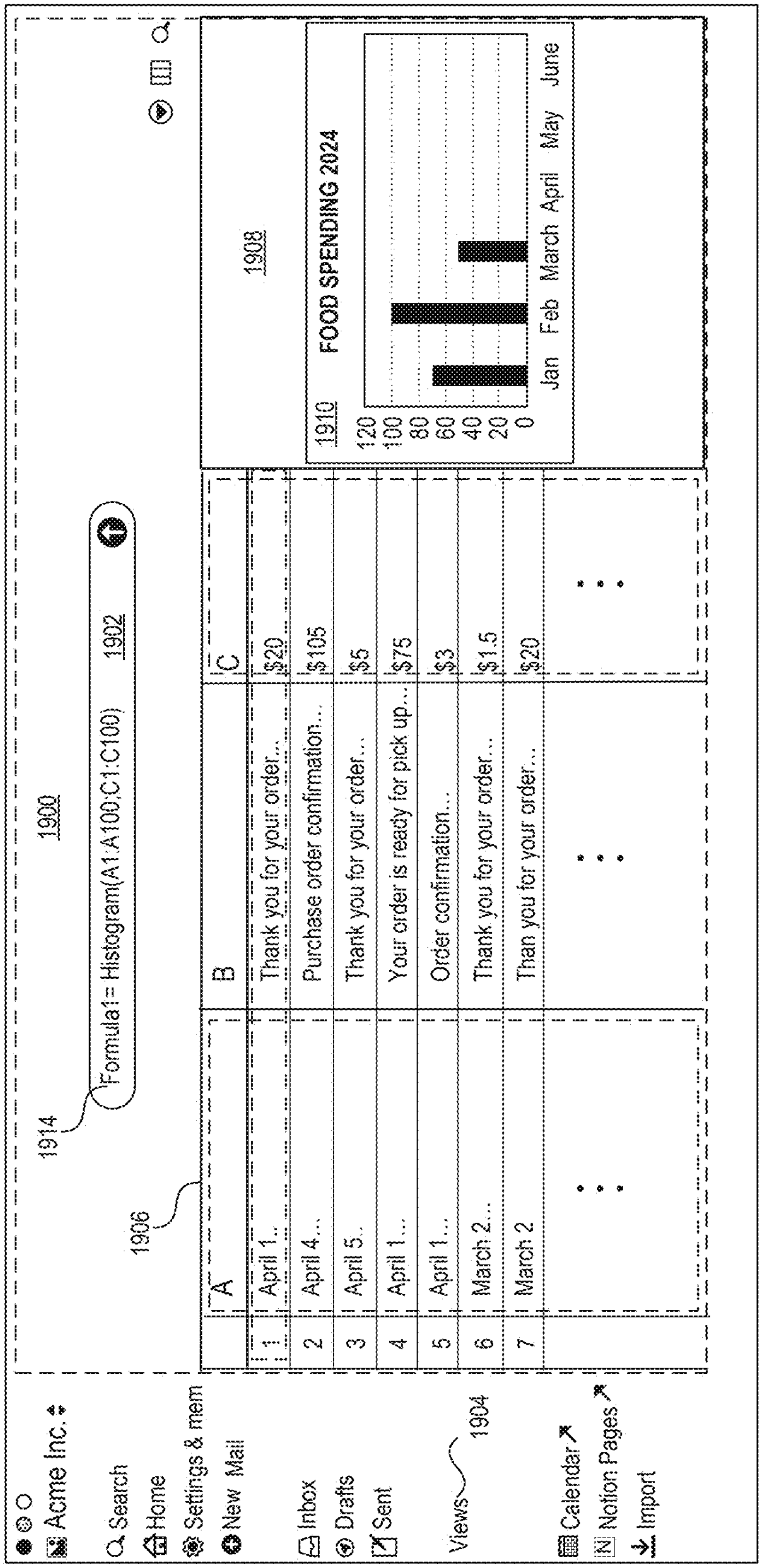
FIG. 19 shows an email user interface with a chart.
Figure 20:
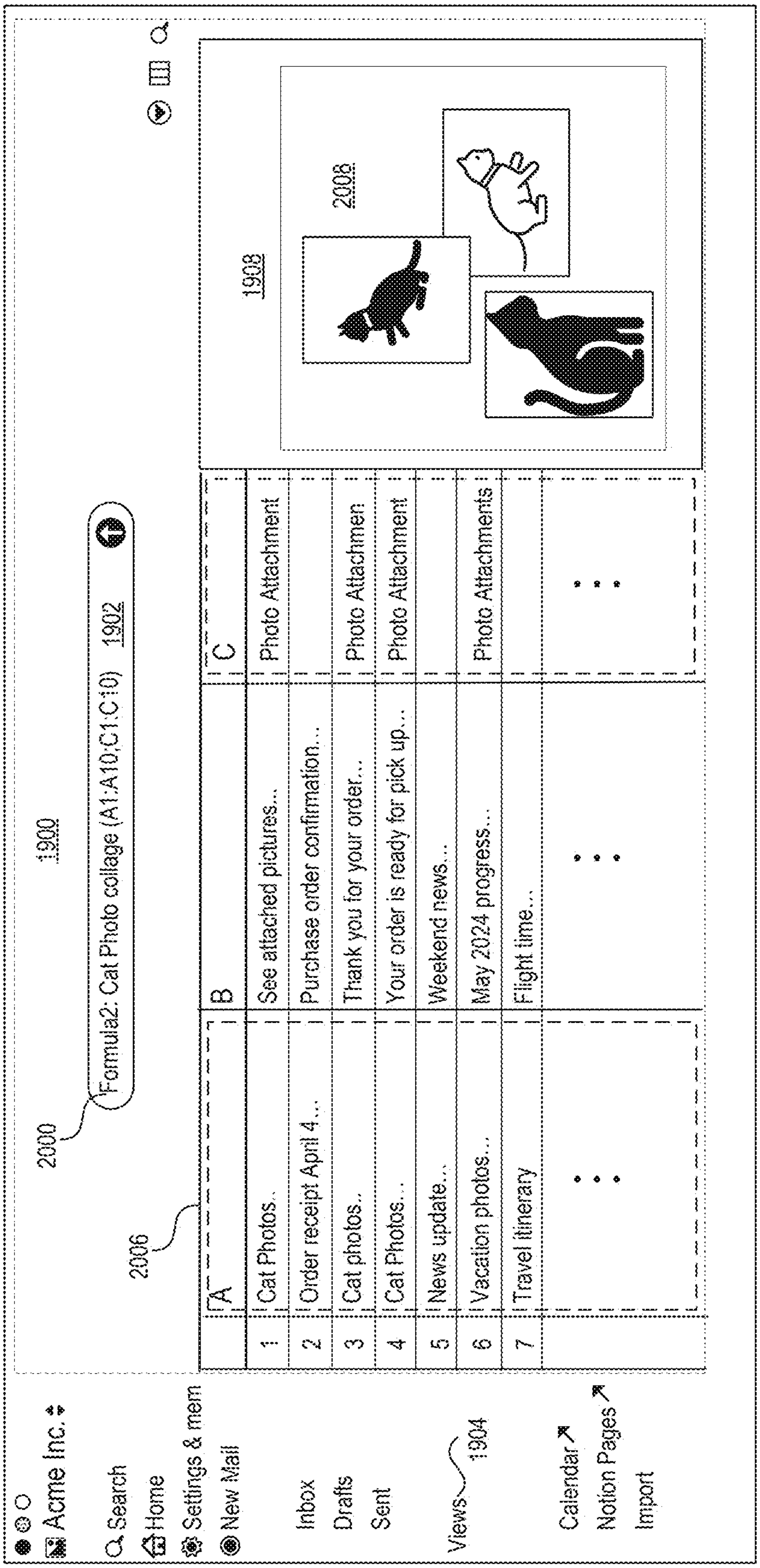
FIG. 20 shows an email user interface with a photo collage.
Figure 21:
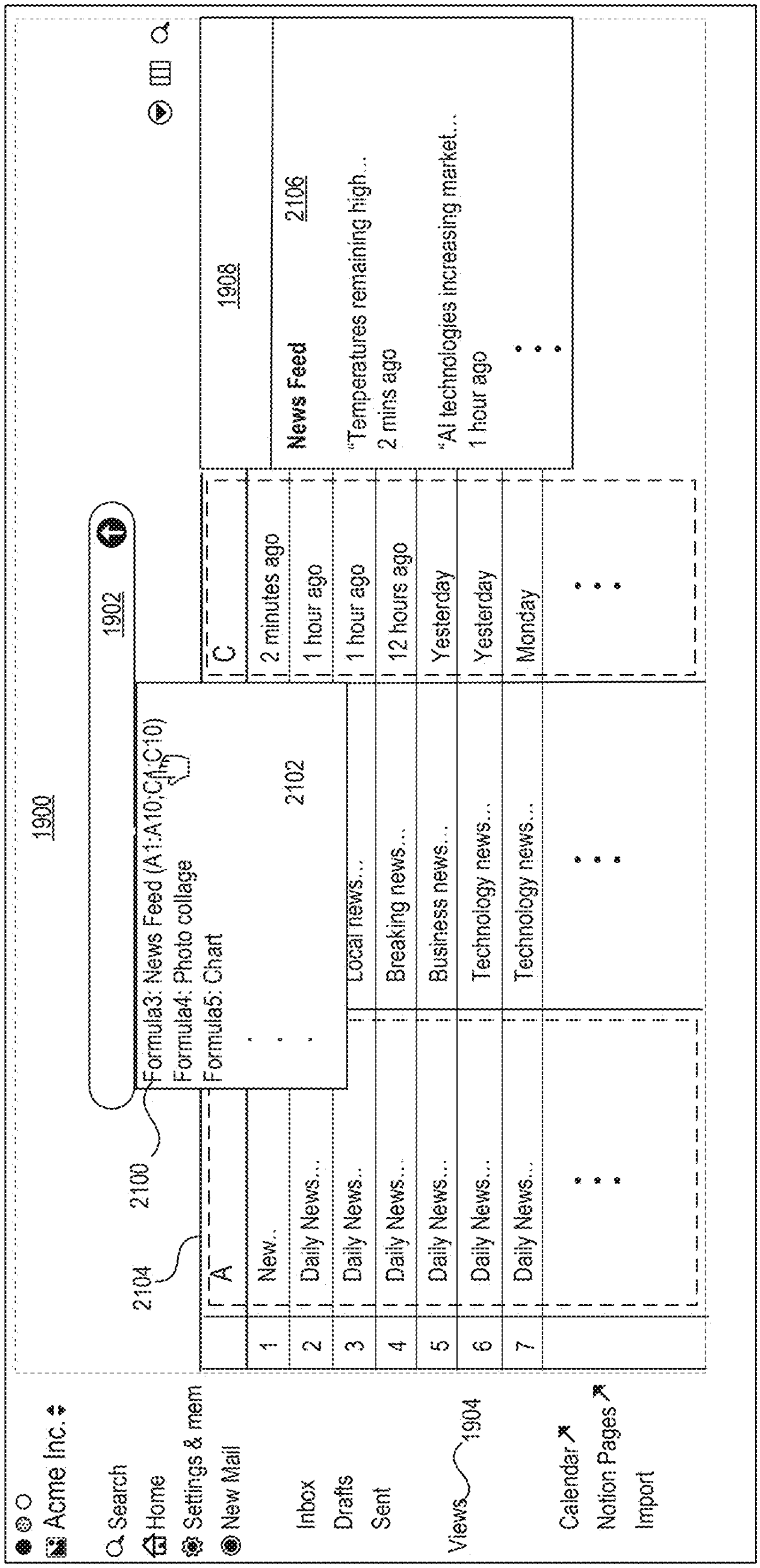
FIG. 21 shows an email user interface with a content summary feed.

As described with respect to earlier implementation of the disclosed user interfaces for email application, email messages can be represented in a table (e.g., as described with respect to FIG. 4 and FIG. 15). FIGS. 19 through 21 further demonstrate user interfaces providing formulas for performing operations on the email messages in a table and generating graphical representations of the email content in accordance with the formulas.

FIG. 19 shows an email user interface 1900 with a histogram 1910. The email user interface 1900 can be associated with an inbox (e.g., the inbox 400 described with respect to FIG. 4). In some implementations, the email user interface 1900 corresponds to the user interface 490 in FIG. 4. The email user interface 1900 includes multiple email messages arranged in a table 1906 with multiple columns (e.g., columns A, B, C, . . . ) and multiple rows (e.g., rows 1, 2, 3, . . . ). The email user interface 1900 also includes a graphical representation section 1908. In some implementations, the table 1906 includes emails from a particular view (e.g., a view 1904 corresponding to the view 470 described with respect to FIG. 4). For example, the table 1906 includes emails that are associated with a subset of all email messages included in the inbox. In FIG. 19, the table 1906 includes email messages that are associated with electronic receipts for purchases associated with food (e.g., grocery purchases, restaurant or coffee purchases, online orders for meals or grocery). In some implementations, the table 1906 can be created based on features extracted from the content of the email messages. The features can include, for example, keywords or key phrases (e.g., grocery, restaurant, food, order, receipt, etc.). In some implementations, the table 1906 includes all email messages of the inbox.

Each of the rows corresponds to an email message (e.g., row 1 corresponds to a single email message). In some embodiments, each of the rows can correspond to other property of emails such as a particular sender or particular organization associated with one or more senders. The columns correspond to properties of the email messages. In FIG. 19, column A corresponds to a date (e.g., receipt date of an email), column B corresponds to content (e.g., text of an email body). In some implementations, the columns correspond to features extracted from the content (e.g., column C includes features extract from column B) of a respective email. For example, column C can be created by the AI email tool 1502 as described with respect to FIGS. 15 and 16 in accordance with instructions provided on the prompt block 1520. In FIG. 19, column 19 includes an amount of spending associated with each of the electronic receipts in the email messages.

The alphabets and numbers of the table 1906 can be used as unique identifiers for the email messages and their properties (e.g., called as cells), respectively. For example, the subject of an email of row 1 in the table 1906 can be identified by an identification A1 (or cell A1) corresponding to row 1; column A and the keyword associated with the email of row 7 can be identified by identification C7 (or cell C7) corresponding to row 7; column C.

The representation of the email messages in a table where each email message and associated property or feature can be represented by a unique identifier enables application of mathematical formulas to perform operations on the email messages. For example, the formula block 1902 (or a formula user interface control element) of the email user interface 1900 includes a formula 1914 ("Formula 1"). The formula 1914 can be received on the formula block 1902 as an input from a user.

Formulas can be used for performing calculations and for statistical analytics, as well as for generation of graphical representations of the content of the email messages. The formulas are configured to operate on columns and/or rows identified in the formula. For example, the formula 1914 identifies an operation to be done on columns A and B including rows 1 through 100. The graphical representations can include a variety of charts (histograms, pie charts, tree maps, bar charts, scatter plots, etc.), lists, diagrams (flowcharts, Venn diagrams, network diagrams, organization charts), collages (e.g., photo collages, text collages, mixed media collages), and/or any other graphical representations of data. The graphical representations can be interactive. In some implementations, the graphical representations are automatically updated by the system as new email messages are received. The graphical representations can provide for an efficient, informative, and/or entertaining means for a user to review content of multiple email messages.

In FIG. 19, the formula 1914 identifies an operation of generating a histogram from the content of email messages included in rows 1 through 100 and columns A and C. As shown, the corresponding cells are highlighted with a dashed line in FIG. 19. For example, the system can identify purchase dates from column A associated with the respective emails (e.g., March, April) and the values spent on the purchases from column C. The formula 1914 can further define additional parameters (e.g., senders, additional keywords, email status (e.g., read versus unread), etc.) for generating a chart. For example, the formula can define a certain period of time of interest (e.g., year 2024) so that the data represented corresponds to that time period. The system can process this data in accordance with the formula to create the histogram 1910 displayed on the graphical representation section 1908. The histogram 1910 can illustrate the spending associated with food purchases.

In some implementations, the formula 1914 is provided by a user (e.g., as a text input on the formula block 1902). In some implementations, the system causes an AI system (e.g., the AI tool described with respect to FIG. 1) to extract information from the email messages of the table 1906 to create the formula 1914. For example, the system can send the content of the table 1906 and instructions to formulate a chart illustrating spending to the AI system. The AI system can generate the formula based on the content of the table 1906 and the instructions.

FIG. 20 shows the email user interface 1900 with a photo collage 2008. In FIG. 20, the formula 2000 in the formula block 1902 is configured to perform an operation on email messages of a table 2006 to create a photo collage of cat photos. For example, the formula 2000 identifies any emails in the identified rows 1 through 100 that have one or more photo attachments and further identifies, based on the content of the emails or their attachments in column A, emails that mention a particular keyword (e.g., "cat" or "cat photos"). Based on the formula 2000, the photo collage 2008 is created and displayed on the graphical representation section 1908 of the email user interface 1900.

FIG. 21 shows the email user interface 1900 with a content summary feed 2106. The content summary feed 2106 includes a list of summaries (e.g., AI generated summaries described with respect to FIGS. 15 and 16) that are generated based on email messages of a table 2104. In some implementations, the list of summaries can be updated in real time as new email messages are received. The updates can be automatic so that a user can view a continuously updated feed of the email message summaries. In FIG. 21, the content summary feed 2106 is defined by a formula 2100 (Formula 3) to provide a feed of news. The formula 2100 is, for example, configured to operate on email messages that are associated with news providers (e.g., based on a user's subscription to such news emails). For example, the formula 2100 can be configured to cause the AI system to generate summaries of the content of emails received from news providers and display the AI generated summaries on the content summary feed 2106 ("News Feed") in real time. As another example, the formula 2100 can be configured to generate summaries of a subset of emails (e.g., a summary of all unread newsletters or a summary of all unread emails).

As described above, in some instances the formulas are generated by the AI system. In some implementations, the system can also provide suggested formulas 2102, e.g., as shown in a drop-down menu in FIG. 21. The suggested formulas can be created by the AI system, be created by a user, or be predefined as a feature of the associated inbox. A user can select a formula by an input on the drop-down menu.

Figure 22:
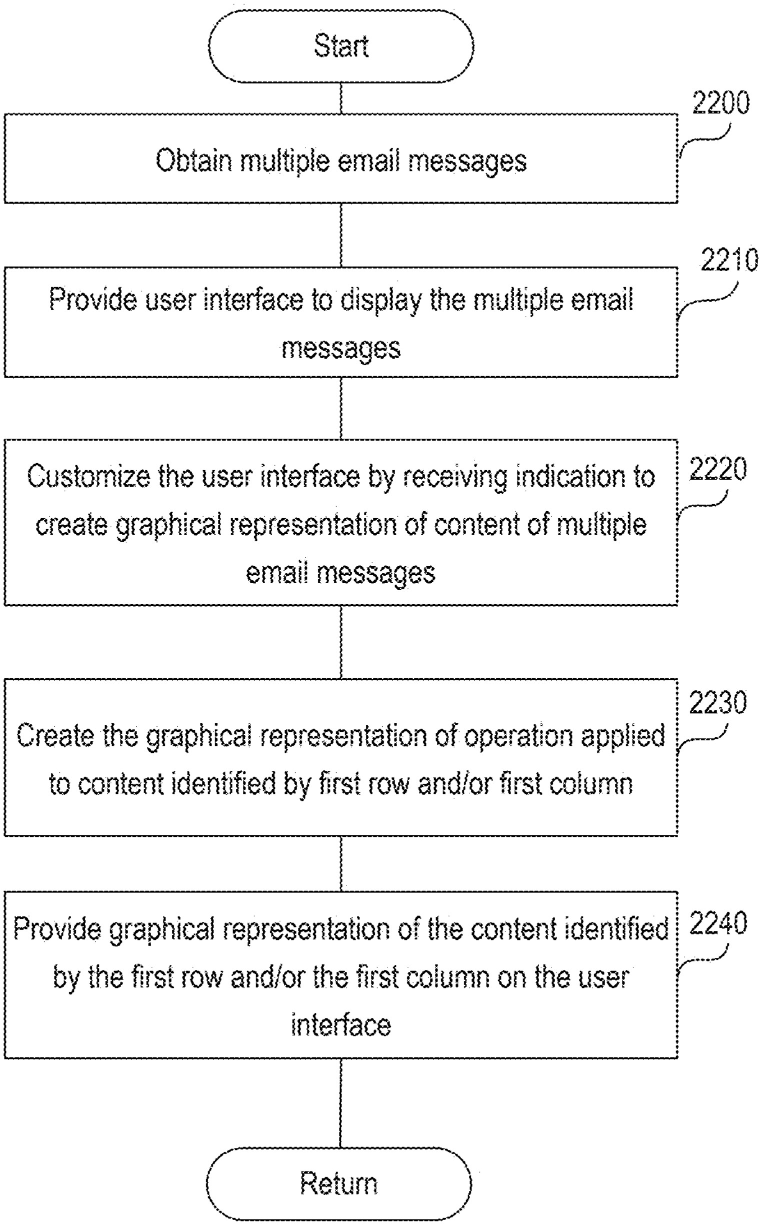
FIG. 22 is a flowchart of a method for providing formulas and charts to modify an email user interface.

FIG. 22 is a flowchart of a method for providing formulas and charts to modify an email user interface (e.g., the email user interface 1900 in FIG. 19). A hardware or software processor described in this application can in step 2200 obtain multiple email messages. An email message among the multiple email messages can include multiple properties (e.g., a sender, a receiver, a date, a subject, keywords/tags, a summary, email body content, and/or attachments). Each of the multiple email messages can include content.

At 2210, the system can provide a user interface to display the multiple email messages (e.g., the email user interface 1900 in FIG. 19). The multiple email messages can be configured to be presented in a table (e.g., the email messages in table 1906) including multiple rows (e.g., rows 1, 2, 3, . . . ) and multiple columns (e.g., columns A, B, C, . . . ). A row among the multiple rows can correspond to one or more email messages. A first column among the multiple columns can include features extracted from the content of the multiple email messages. In some implementations, the system can cause an artificial intelligence (AI) system to extract the features from the content of the multiple email messages and provide the features in the first column of the table (e.g., as described with respect to FIGS. 15 and 16). For example, column C in FIG. 19 can include features (e.g., the dollar amount spent extracted from an electronic receipt) that are extracted from the content of the respective email messages in column B. Alternatively, the first column can include features that are extracted from an email message automatically (e.g., without the use of the AI tool). Such features can include a sender, a receiver, a date, etc.

The user interface can include a unique identification (ID) associated with the row and a unique ID associated with the first column. For example, the rows are identified with numbers and columns are identified with alphabets in the table 1906 in FIG. 19. Each cell in the table 1906 is identified as a combination of a number and an alphabet.

At 2220, the system can customize the user interface by receiving an indication (e.g., an input) to create a graphical representation of the content of the multiple email messages. The indication can include obtaining a first formula (e.g., the formula 1914 in FIG. 19) configured to create the graphical representation, where the first formula includes the unique ID associated with the row and/or the unique ID associated with the first column. The first formula can indicate an operation to be performed on a content identified by the first row and/or the first column.

At 2230, the system can create the graphical representation of the operation applied to the content identified by the first row and/or the first column. At 2240, the system can provide the graphical representation (e.g., the histogram 1910 in the graphical representation section 1908 in FIG. 19) of the content identified by the first row and/or the first column on the user interface. The graphical representation can provide an efficient way for a user to review content from the emails in the table 1906 without reviewing details of each of the emails.

In some implementations, the system can receive the first formula. For example, the formula 1914 in FIG. 19 is received on the formula block 1902. The first formula can include the unique ID associated with the row and the unique ID associated with the first column (e.g., "A1:A100;C1:C100"). The first formula indicates an operation (e.g., an operation to create a histogram) to perform the content identified by the first row and/or the first column. The system can perform the operation on the content identified by the first row and/or the first column, without performing the operation on the multiple email messages. The system can create the graphical representation of the operation applied to the content identified by the first row and/or the first column. The system can provide the graphical representation of the content identified by the first row and/or the first column on the user interface. In some implementations, the formula can identify multiple columns and/or multiple rows for performing an operation for creating a graphical representation.

In some implementations, the system can provide a user interface element (e.g., the formula prompt block 1902 in FIG. 19) configured for receiving an input for indications to create graphical representations. Obtaining the first formula can include obtaining a user input defining the first formula on the user interface element.

In some implementations, the system can provide suggestions for formulas (e.g., the suggested formulas 2102 in the drop-down menu in FIG. 21) configured to create graphical representations. The suggestions for formulas can include the first formula. Obtaining the first formula can include receiving a user input for selecting the first formula from among the suggested formulas. In some implementations, the system can cause a generative AI system to create formulas configured to create graphical representations. The system can provide the AI generated formulas on the user interface. For example, the suggested formulas 2102 are created by the generative AI system. Obtaining the first formula can include receiving a user input selecting the first formula from among the AI generated formulas.

In some implementations, a second column (e.g., column A in FIG. 19) among the multiple columns includes a property of the multiple properties associated with the email messages. The first formula is configured to create the graphical representation based on the first column (e.g., column C) and the second column (e.g., column A).

In some implementations, creating the graphical representation includes creating a photo collage (e.g., the photo collage 2008 in FIG. 20) of one or more photo attachments from each of the email messages. The first column (e.g., column C in FIG. 20) can include photo attachments extracted from the content of the multiple email messages. The operation indicated by the first formula can include creating the photo collage from the photo attachments in the first column.

In some implementations, creating the graphical representation includes creating a chart (e.g., the histogram 1910 in FIG. 19) descriptive of spending based on the first column. The multiple email messages can include electronic receipts (e.g., the email messages in the table 1906 include electronic receipts). The first column can include the amount of spending extracted from the electronic receipts of the email messages.

In some implementations, creating the graphical representation includes generating summaries (e.g., as described with respect to FIGS. 15 and 16) of the content of the multiple email messages and adding the generated summaries as features to the first column. The graphical representation can include a content feed (e.g., the content feed 2106 in FIG. 21) including a list of the generated summaries.

Computer System

Figure 23:
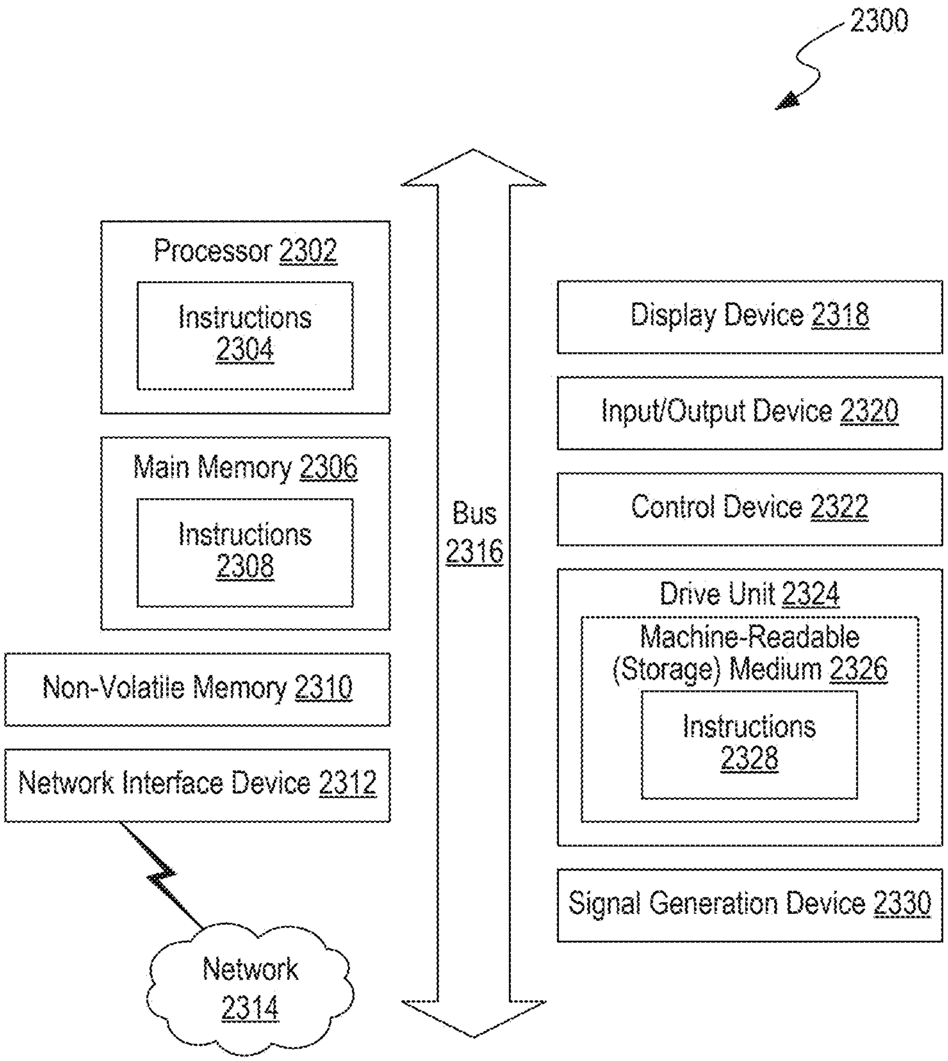
FIG. 23 is a block diagram that illustrates an example of a computer system in which at least some operations described herein can be implemented.

FIG. 23 is a block diagram that illustrates an example of a computer system 2300 in which at least some operations described herein can be implemented. As shown, the computer system 2300 can include: one or more processors 2302, main memory 2306, non-volatile memory 2310, a network interface device 2312, a display device 2318, an input/output device 2320, a control device 2322 (e.g., keyboard and pointing device), a drive unit 2324 that includes a machine-readable (storage) medium 2326, and a signal generation device 2330 that are communicatively connected to a bus 2316. The bus 2316 represents one or more physical buses and/or point-to-point connections that are connected by appropriate bridges, adapters, or controllers. Various common components (e.g., cache memory) are omitted from FIG. 23 for brevity. Instead, the computer system 2300 is intended to illustrate a hardware device on which components illustrated or described relative to the examples of the Figures and any other components described in this specification can be implemented.

The computer system 2300 can take any suitable physical form. For example, the computer system 2300 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 2300. In some implementations, the computer system 2300 can be an embedded computer system, a system-on-chip (SOC), a single-board computer (SBC) system, or a distributed system such as a mesh of computer systems or include one or more cloud components in one or more networks. Where appropriate, one or more computer systems 2300 can perform operations in real time, near real time, or in batch mode.

The network interface device 2312 enables the computer system 2300 to mediate data in a network 2314 with an entity that is external to the computer system 2300 through any communication protocol supported by the computer system 2300 and the external entity. Examples of the network interface device 2312 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 2306, non-volatile memory 2310, and machine-readable medium 2326) can be local, remote, or distributed. Although shown as a single medium, the machine-readable medium 2326 can include multiple media (e.g., a centralized/distributed database and/or associated caches and servers) that store one or more sets of instructions 2328. The machine-readable medium 2326 can include any medium that is capable of storing, encoding, or carrying a set of instructions for execution by the computer system 2300. The machine-readable medium 2326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 2310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2304, 2308, 2328) set at various times in various memory and storage devices in computing device(s). When read and executed by the processor 2302, the instruction(s) cause the computer system 2300 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above and any that may be listed in accompanying filing papers are incorporated herein by reference in their entireties, except for any subject matter disclaimers or disavowals and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory, computer-readable storage medium comprising instructions recorded thereon, wherein the instructions, when executed by at least one data processor of a system, cause the system to:

obtain multiple views associated with a first multiplicity of email messages, wherein a view among the multiple views includes a criterion, a visual appearance, and an action, wherein the criterion defines an email message to include in the view, wherein the action is configured to trigger automatically when the email message is included in the view;

provide the multiple views to a user associated with a second multiplicity of email messages;

receive an indication to apply the view among the multiple views to the second multiplicity of email messages;

apply the view to the second multiplicity of email messages by:

selecting a subset of email messages among the second multiplicity of email messages according to the criterion;

presenting the subset of email messages to the user according to the visual appearance associated with the view; and performing the action on the subset of email messages;

determine whether the email message is a request for support;

obtain a history of support requests and a corresponding history of responses to the history of support requests;

determine whether the request for support matches a support request in the history of support requests;

upon determining that the request for support matches the support requests in the history of support requests, obtain a corresponding response in the history of responses;

provide the corresponding response to the request for support; and upon determining that the request for support does not match the support request in the history of support requests, create a ticket indicating the request for support.

2. The non-transitory, computer-readable storage medium of claim 1, wherein instructions to select the subset of email messages comprise instructions to:

obtain the criterion indicating to select the subset of email messages if the subset of email messages includes an unsubscribe link; and include a second email message in the subset of email messages, when the second email message includes the unsubscribe link.

3. The non-transitory, computer-readable storage medium of claim 1, wherein instructions to select the subset of email messages comprise instructions to:

obtain the criterion including a natural language instruction and/or an example classification according to the natural language instruction;

provide the natural language instruction and the second multiplicity of email messages to a large language model; and obtain from the large language model the subset of email messages.

4. The non-transitory, computer-readable storage medium of claim 1, wherein instructions to present the subset of email messages comprise instructions to:

obtain the visual appearance, wherein the visual appearance defines a layout of the subset of email messages, wherein the layout includes representing the subset of email messages in a calendar, or wherein the layout includes a representation of a custom property, and wherein the custom property includes a property extracted from the email message; and present the subset of email messages using the layout.

5. The non-transitory, computer-readable storage medium of claim 1, wherein instructions to perform the action on the subset of email messages comprise instructions to:

obtain the action indicating to archive the subset of email messages, or to unsubscribe from the subset of email messages; and unsubscribe from the subset of email messages; or archive the subset of email messages.

6. The non-transitory, computer-readable storage medium of claim 1, comprising instructions to:

obtain the view defining the criterion selecting a first subset of email messages among the first multiplicity of email messages, wherein the criterion is based on a receiver of the first subset of email messages, wherein the receiver includes a first user associated with the first multiplicity of email messages and the user associated with the second multiplicity of email messages; and provide the first subset of email messages to the user associated with the second multiplicity of email messages, wherein the first subset of email messages is presented according to the visual appearance associated with the view.

7. A method comprising:

obtaining multiple views associated with a first multiplicity of messages, wherein a view among the multiple views includes a criterion, a visual appearance, and an action, wherein the criterion defines a message to include in the view, wherein the action is configured to trigger automatically when the message is included in the view;

applying the view to a second multiplicity of messages associated with a user by:

selecting a subset of messages among the second multiplicity of messages according to the criterion;

presenting the subset of messages to the user according to the visual appearance associated with the view;

performing the action on the subset of messages;

obtaining the view defining the criterion selecting a first subset of messages among the first multiplicity of messages, wherein the criterion is based on a receiver of the first subset of messages, and wherein the receiver includes a first user associated with the first multiplicity of messages and the user associated with the second multiplicity of messages; and providing the first subset of messages to the user associated with the second multiplicity of messages, wherein the first subset of messages is presented according to the visual appearance associated with the view.

8. The method of claim 7, wherein selecting the subset of messages comprises:

obtaining the criterion including a natural language instruction and/or an example classification according to the natural language instruction;

providing the natural language instruction and the second multiplicity of messages to a large language model; and obtaining from the large language model the subset of messages.

9. The method of claim 7, wherein presenting the subset of messages comprises:

obtaining the visual appearance, wherein the visual appearance defines a layout of the subset of messages, wherein the layout includes representing the subset of messages in a calendar, or wherein the layout includes a representation of a custom property, and wherein the custom property includes a property extracted from the message; and presenting the subset of messages using the layout.

10. The method of claim 7, wherein performing the action on the subset of messages comprises:

obtaining the action indicating to archive the subset of messages, or to unsubscribe from the subset of messages; and unsubscribing from the subset of messages; or archiving the subset of messages.

11. The method of claim 7, wherein performing the action on the subset of messages comprises:

determining whether the message is a request for support;

obtaining a history of support requests and a corresponding history of responses to the history of support requests;

determining whether the request for support matches a support request in the history of support requests;

upon determining that the request for support matches the support requests in the history of support requests, obtaining a corresponding response in the history of responses;

providing the corresponding response to the request for support; and upon determining that the request for support does not match the support request in the history of support requests, creating a ticket indicating the request for support.

12. A system comprising:

at least one hardware processor; and at least one non-transitory memory storing instructions, which, when executed by the at least one hardware processor, cause the system to:

obtain multiple views associated with a first multiplicity of messages, wherein a view among the multiple views includes a criterion, a visual appearance, and an action, wherein the criterion defines a message to include in the view, wherein the action is configured to trigger automatically when the message is included in the view;

apply the view to a second multiplicity of messages associated with a user by:

selecting a subset of messages among the second multiplicity of messages according to the criterion;

presenting the subset of messages to the user according to the visual appearance associated with the view; and performing the action on the subset of messages;

obtain the view defining the criterion selecting a first subset of messages among the first multiplicity of messages, wherein the criterion is based on a receiver of the first subset of messages, and wherein the receiver includes a first user associated with the first multiplicity of messages and the user associated with the second multiplicity of messages; and provide the first subset of messages to the user associated with the second multiplicity of messages, wherein the first subset of messages is presented according to the visual appearance associated with the view.

13. The system of claim 12, wherein instructions to select a subset of messages comprise instructions to:

obtain the criterion indicating to select the subset of messages if the subset of messages includes an unsubscribe link; and include a second message in the subset of messages, when the second message includes the unsubscribe link.

14. The system of claim 12, wherein instructions to select a subset of messages comprise instructions to:

obtain the criterion including a natural language instruction and/or an example classification according to the natural language instruction;

provide the natural language instruction and the second multiplicity of messages to a large language model; and obtain from the large language model the subset of messages.

15. The system of claim 12, wherein instructions to present the subset of messages comprise instructions to:

obtain the visual appearance, wherein the visual appearance defines a layout of the subset of messages, wherein the layout includes representing the subset of messages in a calendar, or wherein the layout includes a representation of a custom property, and wherein the custom property includes a property extracted from the message; and present the subset of messages using the layout.

16. The system of claim 12, wherein instructions to perform the action on the subset of messages comprise instructions to:

obtain the action indicating to archive the subset of messages, or to unsubscribe from the subset of messages; and unsubscribe from the subset of messages; or archive the subset of messages.

17. The system of claim 12, wherein instructions to perform the action on the subset of messages comprise instructions to:

determine whether the message is a request for support;

obtain a history of support requests and a corresponding history of responses to the history of support requests;

determine whether the request for support matches a support request in the history of support requests;

upon determining that the request for support matches the support requests in the history of support requests, obtain a corresponding response in the history of responses;

provide the corresponding response to the request for support; and upon determining that the request for support does not match the support request in the history of support requests, create a ticket indicating the request for support.

* * * * *